US008886200B2

(12) United States Patent
Gogic et al.

(10) Patent No.: US 8,886,200 B2
(45) Date of Patent: Nov. 11, 2014

(54) USING SIGNAL MONITORING TO RESOLVE ACCESS POINT IDENTIFIER AMBIGUITY

(75) Inventors: Aleksandar M. Gogic, San Diego, CA (US); Chandrasekhar T. Sundarraman, San Diego, CA (US); Sanjiv Nanda, Ramona, CA (US); Peerapol Tinnakornsrisuphap, San Diego, CA (US); Rajarshi Gupta, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 442 days.

(21) Appl. No.: 12/560,634

(22) Filed: Sep. 16, 2009

(65) Prior Publication Data

US 2010/0069072 A1     Mar. 18, 2010

Related U.S. Application Data

(60) Provisional application No. 61/098,203, filed on Sep. 18, 2008, provisional application No. 61/158,536, filed on Mar. 9, 2009.

(51) Int. Cl.

| H04W 36/00 | (2009.01) |
| H04W 48/16 | (2009.01) |
| H04W 36/08 | (2009.01) |
| H04W 48/08 | (2009.01) |
| H04W 84/04 | (2009.01) |
| H04W 8/26  | (2009.01) |
| H04W 24/00 | (2009.01) |

(52) U.S. Cl.
CPC .............. *H04W 48/16* (2013.01); *H04W 48/08* (2013.01); *H04W 36/0083* (2013.01);

(Continued)

(58) Field of Classification Search
CPC ............ H04W 48/16; H04W 36/0083; H04W 36/0055; H04W 36/08; H04W 24/00; H04W 8/26; H04W 84/045; H04W 48/08

USPC ................. 455/436–444, 418–420, 422.1, 455/450–455, 464, 509, 432.1–434; 370/321–337, 338, 339, 341–348, 370/431–463

See application file for complete search history.

(56) References Cited

U.S. PATENT DOCUMENTS 5,913,168 A * 6/1999 Moreau et al. ................ 455/441
6,035,199 A * 3/2000 Barnett .......................... 455/448

(Continued)

FOREIGN PATENT DOCUMENTS

| CN | 1434595 A | 8/2003 |
| CN | 1984459 A | 6/2007 |

(Continued)

OTHER PUBLICATIONS

Ericsson: "Automatic neighbour cell configuration" 3GPP Draft; S5-071484 E Automatic Neighbour Cell Configuration, 3rd Generation Partnership Project (3GPP), Mobile Competence Centre ; 650, Route Des Lucioles ; F-06921 Sophia-Antipolis Cedex ; France, vol. SA WG5, no. Roma; 20070817, Aug. 17, 2007, XP050306143 paragraph [03.4].

(Continued)

*Primary Examiner* — Ronald Eisner

(57) ABSTRACT

Ambiguity (e.g., confusion) associated with access point identifiers may be resolved by querying candidate target access points and/or by using historical records indicative of one or more access points that the access point has previously accessed. For example, messages may be sent to access points that are assigned the same identifier to cause the access points to monitor for a signal from an access terminal that received the identifier from a target access point. The target access point may then be identified based on any responses that indicate that a signal was received from the access terminal. A mapping may be maintained for that access terminal that maps the identifier to that access point so that the mapping may be used to resolve any future confusion associated with the use of that identifier by that access terminal.

52 Claims, 20 Drawing Sheets

(52) U.S. Cl.
CPC ............ *H04W 84/045* (2013.01); *H04W 36/08* (2013.01); *H04W 8/26* (2013.01); *H04W 24/00* (2013.01); *H04W 36/0055* (2013.01)
USPC .......... 455/444; 370/321; 455/63.2; 455/443; 455/436; 455/437; 455/440

(56) References Cited

U.S. PATENT DOCUMENTS

| | | | |
|---|---|---|---|
| 6,075,989 A * | 6/2000 | Moore et al. | 455/436 |
| 6,728,540 B1 | 4/2004 | DeSantis et al. | |
| 7,194,266 B2 * | 3/2007 | Ishikawa et al. | 455/442 |
| 8,345,632 B2 * | 1/2013 | Mildh et al. | 370/331 |
| 8,363,617 B2 | 1/2013 | Meyer | |
| 2003/0061351 A1 | 3/2003 | Prathima et al. | |
| 2003/0146871 A1 * | 8/2003 | Karr et al. | 342/457 |
| 2004/0105401 A1 | 6/2004 | Lee | |
| 2004/0240474 A1 | 12/2004 | Fan | |
| 2005/0008092 A1 * | 1/2005 | Kadous | 375/267 |
| 2006/0203746 A1 * | 9/2006 | Maggenti et al. | 370/254 |
| 2007/0015511 A1 * | 1/2007 | Kwun et al. | 455/436 |
| 2007/0213067 A1 * | 9/2007 | Li et al. | 455/444 |
| 2007/0249291 A1 | 10/2007 | Nanda et al. | |
| 2008/0025227 A1 | 1/2008 | Puttu et al. | |
| 2008/0090571 A1 | 4/2008 | Kwong | |
| 2008/0159222 A1 | 7/2008 | Akram et al. | |
| 2008/0207207 A1 | 8/2008 | Moe et al. | |
| 2008/0227458 A1 | 9/2008 | Wu | |
| 2008/0305801 A1 | 12/2008 | Burgess et al. | |
| 2009/0047956 A1 * | 2/2009 | Moe et al. | 455/436 |
| 2009/0047960 A1 | 2/2009 | Gunnarsson et al. | |
| 2009/0092096 A1 | 4/2009 | Czaja et al. | |
| 2009/0097451 A1 | 4/2009 | Gogic | |
| 2009/0098871 A1 | 4/2009 | Gogic | |
| 2009/0219888 A1 * | 9/2009 | Chen et al. | 370/331 |
| 2010/0008235 A1 | 1/2010 | Tinnakornsrisuphap et al. | |
| 2010/0029278 A1 * | 2/2010 | Fang et al. | 455/436 |
| 2010/0067371 A1 | 3/2010 | Gogic et al. | |
| 2011/0064053 A1 * | 3/2011 | Cha et al. | 370/331 |
| 2013/0148632 A1 | 6/2013 | Gogic et al. | |
| 2013/0150046 A1 | 6/2013 | Gogic et al. | |

FOREIGN PATENT DOCUMENTS

| | | |
|---|---|---|
| CN | 101141793 A | 3/2008 |
| EP | 1271852 A2 | 1/2003 |
| EP | 1626543 A2 | 2/2006 |
| EP | 1670278 A1 | 6/2006 |
| EP | 1732269 A1 | 12/2006 |
| EP | 2056609 A1 | 5/2009 |
| JP | 7504552 T | 5/1995 |
| JP | 2002232929 A | 8/2002 |
| JP | 2005175611 A | 6/2005 |
| JP | 2005348433 A | 12/2005 |
| JP | 2006518961 A | 8/2006 |
| JP | 2008048304 A | 2/2008 |
| RU | 2332814 C2 | 8/2008 |
| WO | WO9318601 A1 | 9/1993 |
| WO | 2004064439 A1 | 7/2004 |
| WO | WO2007103062 A1 | 9/2007 |
| WO | WO2008023609 A1 | 2/2008 |
| WO | WO-2009142054 A1 | 11/2009 |

OTHER PUBLICATIONS

Huawei: "Detection of conflicting cell identities"Oct. 3, 2007, 3GPP Draft; R3-071947 Detection of Conflicting Cell Identities, 3rd Generation Partnership Project (3GPP), Mobile Competence Centre ; 650, Route Des Lucioles ; F-06921 Sophia-Antipolis Cedex ; France , XP050162733 [retrieved on Oct. 3, 2007] the whole document.

International Search Report and Written Opinion—PCT/US2009/057358, International Search Authority—European Patent Office—Mar. 25, 2010.

International Search Report and Written Opinion—PCT/US2009/057360, International Search Authority—European Patent Office—Apr. 13, 2010.

Frenger, P., et al., "Neighbor cell relation list and measured cell identity management in LTE", pp. 152-159, 7 to 11 Apr. 2008.

Taiwan Search Report—TW098131637—TIPO—Nov. 27, 2012.

Boudjit, Saadi, et al., "Duplicate address detection with multiple conflicts and autoconfiguration in OLSR", ICSIT—2005 Conference, Jul. 2005.

Ericsson: "MCI conflict detection and resolution" 3GPP Draft; S5-071569, 3rd Generation Partnership Project (3GPP), Mobile Competence Centre; Sophia-Antipolos Cedex; France, XP050306211, (Aug. 2007).

Pongpaibool, et al., "Fast Duplicate Address Detection for Mobile IP" 15th IEEE International Conference on Networks 2007.

Tseng, Chien-Chao, et. al., "Proactive DAD: A Fast Address-Acquisistion Strategy for Mobile IPv6 Networks." IEEE Internet Computering. Nov.-Dec. 2006.

NTT Docomo et al., "A solution to resolve potential PCI confusion at handover", 3GPP Draft; R2-082963, 3rd Generation Partnership Project (3GPP), Mobile Competence Centre; 650, Route Des Lucioles; F-06921 Sophia-Antipolis Cedex; France, vol. RAN WG2, no. Sophia Antipolis, France; Jun. 2, 2008, XP050142149.

* cited by examiner

USING SIGNAL MONITORING TO RESOLVE ACCESS POINT IDENTIFIER AMBIGUITY

CLAIM OF PRIORITY

This application claims the benefit of and priority to commonly owned U.S. Provisional Patent Application No. 61/098,203, filed Sep. 18, 2008, and U.S. Provisional Patent Application No. 61/158,536, filed Mar. 9, 2009, the disclosure of each of which is hereby incorporated by reference herein.

CROSS-REFERENCE TO RELATED APPLICATION

This application is related to concurrently filed and commonly owned U.S. patent application Ser. No. 12/560,641, entitled "USING IDENTIFIER MAPPING TO RESOLVE ACCESS POINT IDENTIFIER AMBIGUITY," the disclosure of which is hereby incorporated by reference herein.

BACKGROUND

1. Field

This application relates generally to communication and more specifically, but not exclusively, to techniques for resolving ambiguity associated with access point identifiers.

2. Introduction

Wireless communication systems are widely deployed to provide various types of communication to multiple users. For example, voice, data, multimedia services, etc., may be provided to users' access terminals (e.g., cell phones). As the demand for high-rate and multimedia data services rapidly grows, there lies a challenge to implement efficient and robust communication systems with enhanced performance.

To supplement conventional mobile phone network access points (e.g., macro base stations), small-coverage access points may be deployed to provide more robust indoor wireless coverage to access terminals. Such small-coverage access points are generally known as access point base stations, Home NodeBs, Home eNodeBs, femto access points, or femto cells. Typically, such small-coverage access points are connected to the Internet and the mobile operator's network via a DSL router or a cable modem (e.g., when installed in a user's home).

In practice, a relatively large number of small-coverage access points may be deployed in a given area (e.g., within the coverage area of a given macro cell). Consequently, several of these access points may be assigned the same identifier since the number of available identifiers is typically limited (e.g., physical layer identifiers may be only 10 bits long). As a result, confusion may exist as to which access point (e.g., handover target) is being referenced when an access terminal in the network reports to its serving access point (e.g., handover source) that a signal has been received from an access point having a given identifier. Thus, there is a need for effective techniques for identifying access points so that other nodes in the network may efficiently communicate with the access points.

SUMMARY

A summary of sample aspects of the disclosure follows. It should be understood that any reference to the term aspects herein may refer to one or more aspects of the disclosure.

The disclosure relates in some aspects to resolving ambiguity (e.g., confusion) associated with access point identifiers. For example, when an access terminal acquires a signal comprising an identifier of the access point that transmitted the signal and it is determined that the access terminal should be handed-over to that access point, confusion may arise as to the precise identity of the access point identified by that identifier. Various techniques are described herein for resolving ambiguities such as this.

The disclosure relates in some aspects to sending a message to one or more access points that are assigned an identifier that is subject to confusion, whereby each message requests a given access point to monitor for a signal from the access terminal that reported the identifier. The target access point may then be identified based on any responses that indicate that a signal was received from the access terminal. For example, if only one response is received, it may be assumed that the access point that sent the response is the target access point. Conversely, if more than one response is received, the access point that received the signal having the highest received signal strength may be identified as the target access point.

In some cases a tiered target selection scheme may be employed. For example, initially, a request may be sent to each access point associated with a first priority tier (e.g., home femto nodes of the access terminal to be handed-over). If the target access point cannot be identified from the response(s) from the first tier access point(s), a request may be sent to each access point associated with a second priority tier (e.g., access points that the access terminal has previously accessed). If the target access point cannot be identified from the response(s) from the second tier access point(s), a request may be sent to each access point associated with a third priority tier, and so on. In addition, different algorithms may be employed at different tiers. For example, one tier may involve making a decision based on the relative received signal strengths included with the responses, while another tier may involve making a decision based on a comparison of the macro neighbor list of the access terminal with the macro neighbor lists of the responding access points.

The disclosure relates in some aspects to resolving identifier confusion based on historical records relating to which access points an access terminal has previously accessed. For example, it may be determined based on prior handoffs of a given access terminal that when that access terminal reports a given identifier, the access terminal usually (or always) ends up being handed-off to a particular access point (or any one of a limited set of access points). Accordingly, a mapping may be made for that access terminal that maps the identifier to one or more access points. Thus, if that identifier is subsequently received from that access terminal, the mapping may be used to identify which access point(s) should be prepared for handover of the access terminal.

BRIEF DESCRIPTION OF THE DRAWINGS

These and other sample aspects of the disclosure will be described in the detailed description and the appended claims that follow, and in the accompanying drawings, wherein:

Figure 1:
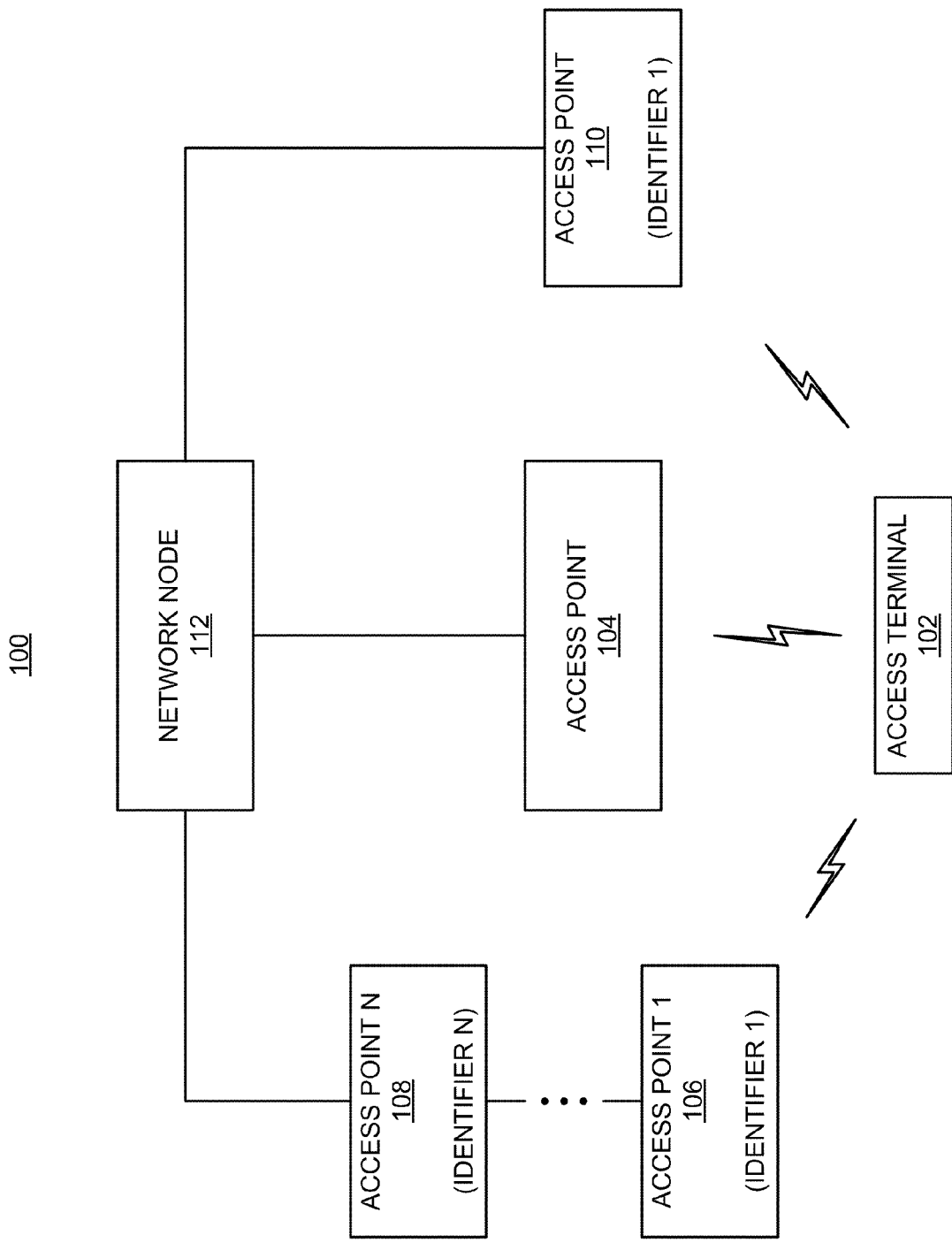
FIG. 1 is a simplified block diagram of several sample aspects of a communication system.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network nodes that communicate with one another. It should be appreciated, however, that the teachings herein may be applicable to other types of apparatuses or other similar apparatuses that are referenced using other terminology. For example, in various implementations access points may be referred to or implemented as base stations or eNodeBs, access terminals may be referred to or implemented as user equipment or mobile stations, and so on.

Access points in the system 100 provide one or more services (e.g., network connectivity) for one or more wireless terminals that may be installed within or that may roam throughout a coverage area of the system 100. For example, at various points in time the access terminal 102 may connect to an access point 104, any one of a set of access points 1-N (represented by access points 106 and 108 and the associated ellipsis), or an access point 110.

Each of the access points 104-110 may communicate with one or more network nodes (represented, for convenience, by network node 112) to facilitate wide area network connectivity. Such network nodes may take various forms such as, for example, one or more radio and/or core network entities. Thus, in various implementations the network node 110 may represent functionality such as network management (e.g., via an operation, administration, management, and provisioning entity), call control, mobility management, gateway functions, interworking functions, or some other suitable network functionality.

Each access point in the system 100 may be assigned a first type of identifier that may be used to readily identify the access point. Here, the number of bits in the identifier may be relatively small so that a signal including this identifier may be easily detected by an access terminal (e.g., even when the access terminal has an active call). In various implementations such an identifier may comprise, for example, a physical cell identifier ("PCI"), a pilot pseudonoise ("PN") offset, or an acquisition pilot. Typically, a fixed quantity of node identifiers (e.g., 500 or less) is defined for a given system. In such a case, identifier confusion may often arise when a large number of access points (e.g., femto access points) are deployed in the same vicinity since several of these access points may be assigned the same identifier.

An overview of how identifier confusion may be resolved in accordance with the teachings herein will be described with reference to FIG. 1 and the flowchart of FIG. 2. FIG. 1 illustrates a simple example where the access point 106 and the access point 110 are both assigned "identifier 1." As the access terminal 102 roams through the system 100, the access terminal 102 may be handed over from a source access point (i.e., the serving access point to which the access terminal is currently connected, e.g., access point 104) to a target access point (e.g., access point 110).

Figure 2:
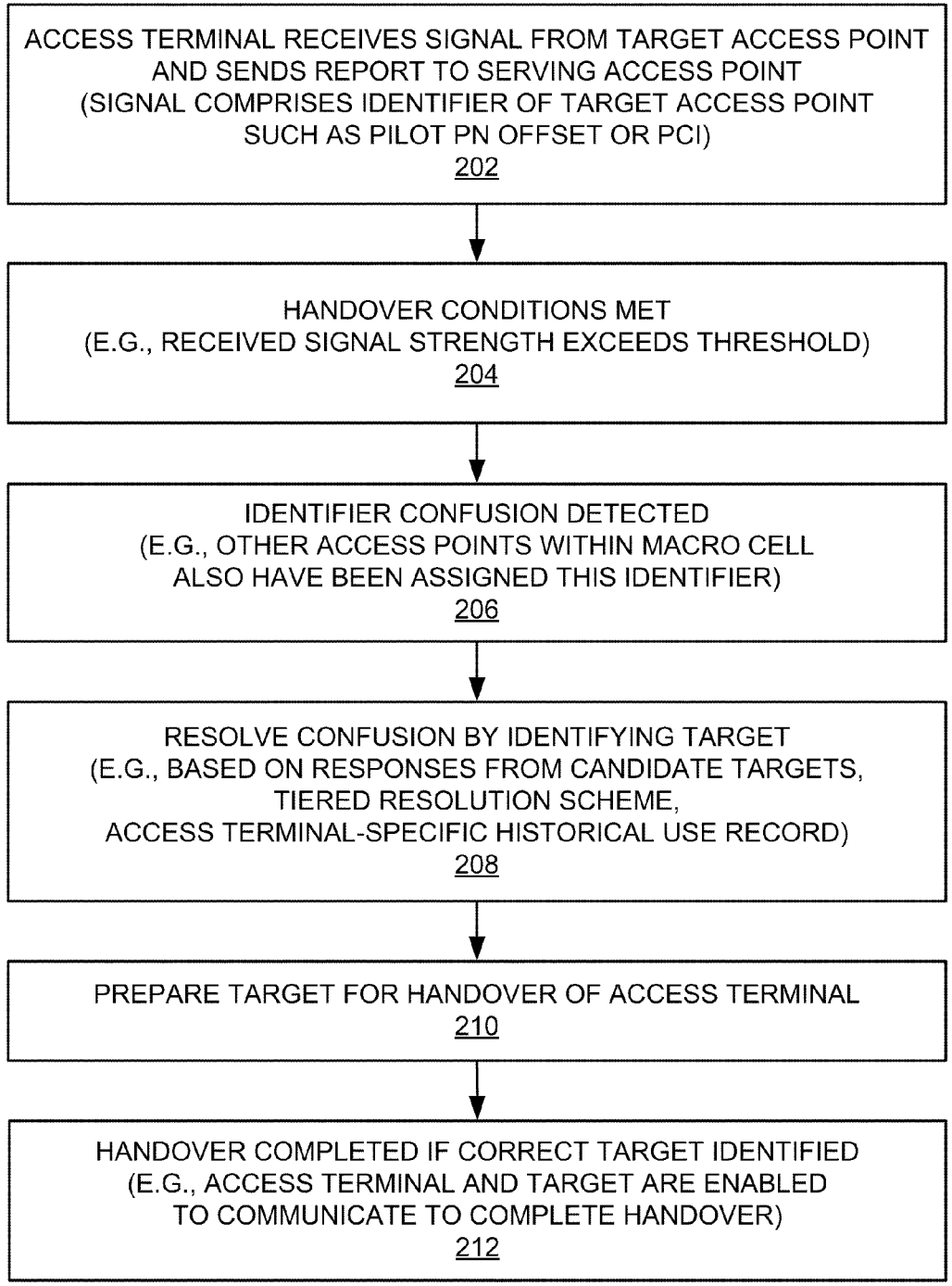
FIG. 2 is a flowchart illustrating several sample aspects of handover operations.

For example, as represented by block 202 of FIG. 2, at some point in time the access terminal 102 receives a signal from a potential target access point. This signal may comprise (e.g., include or be encoded or scrambled with) an identifier of the potential target access point such as a pilot PN offset or a PCI. Upon receipt of this signal, the access terminal 102 may send a message (e.g., a measurement report) including the identifier and an indication of the associated received signal strength (e.g., RSSI) to its current serving access point.

As represented by block 204, a decision may be made to handover the access terminal 102 to the target access point. This decision may be based, for example, on whether the access terminal 102 is receiving particularly strong pilot signals (e.g., exceeding a threshold) from that target access point.

In the absence of confusion, the first identifier (e.g., identifier 1) acquired by the access terminal 102 may be unambiguously mapped to a second identifier assigned to the target access point that is used to establish communication with the target access point. In some aspects, the second identifier may be more unique (e.g., comprise more bits) than the first identifier. For example, the second identifier may be unique within a larger geographic area, may be unique within an entire network (e.g., a wireless operator network) or subnet, or may be more unique in some other manner. In various implementations such an identifier may comprise, for example, a global cell identifier (CGI), an access node identifier (ANID), a cell global identification (ICGI), a sector identifier, or an IP address.

As represented by block 206, however, in some cases more than one access point within a given area may be assigned the same first identifier. For example, femto access points 106 and 110 within the coverage area of a source macro access point 104 may be assigned identifier 1. When confusion does exist, the source access point may not be able to determine which access point is the desired target access point. For example, the access point 104 may not be able to determine whether to communicate with the access point 106 or the access point 110 to reserve resources for the access terminal.

As represented by block 208, confusion such as this may be resolved by identifying a target access point through the use of one or more of the techniques described herein. For example, as described in more detail below in conjunction with FIGS. 3A-6, a target may be identified by requesting potential targets to monitor for signals from the access terminal to be handed-over and processing the results of this monitoring to determine which of these potential targets is most likely to be the intended target. In some aspects, this determination may utilize a tiered target resolution scheme. In addition, as described in more detail below in conjunction with FIGS. 7-10, one or more candidate targets may be identified based on historical use records that are maintained for the access terminal. For example, a mapping may be maintained that identifies a specific access point (e.g., via a CGI) that the access terminal is typically handed-off to when the access terminal reports a given identifier (e.g. PCI).

As represented by block 210, the target access point identified at block 208 is prepared for handover of the access terminal 102. Here, the serving access point (i.e., the source access point for the handover) may communicate with the target access point to reserve resources for the access terminal. For example, context information maintained by the serving access point may be transferred to the target access point and/or context information maintained by the target access point may be sent to the access terminal 102.

As represented by block 212, the handover may then be completed assuming the correct target access point was prepared for the handover. Here, the access terminal and the target access point may communicate with one another in accordance with conventional handover procedures.

With the above overview in mind, various techniques that may be employed to resolve confusion through the use of target monitoring in accordance with the teachings herein will be described with reference to FIGS. 3A-6. For illustration purposes, the operations of FIGS. 3A-6 (or any other operations discussed or taught herein) may be described as being performed by specific components. It should be appreciated, however, that these operations may be performed by other types of components and may be performed using a different number of components. It also should be appreciated that one or more of the operations described herein may not be employed in a given implementation.

Figure 3A:
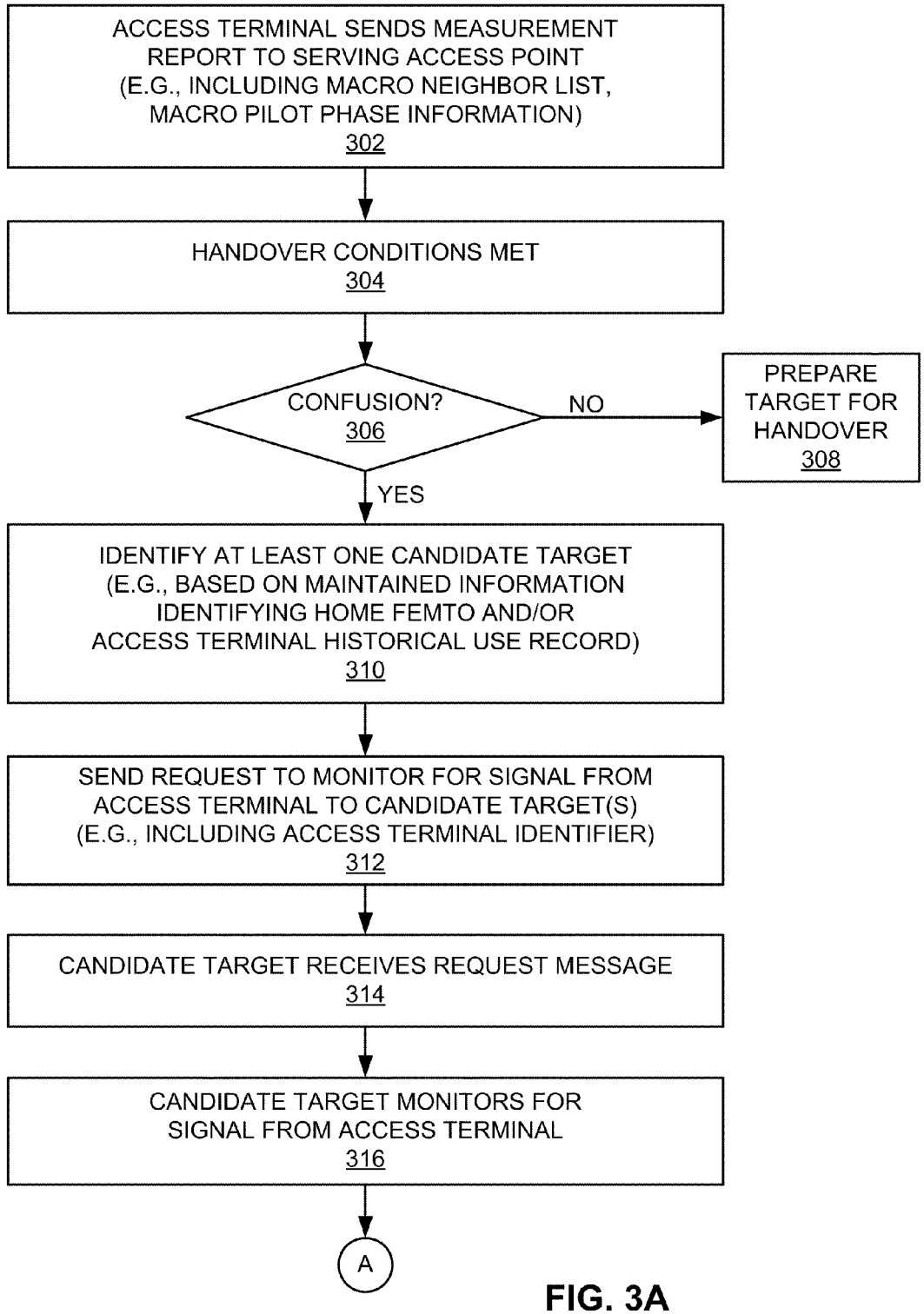
FIGS. 3A and 3B are a flowchart illustrating several sample aspects of handover operations.

As represented by block 302 of FIG. 3A, upon acquisition of a signal from a target access point, an access terminal sends a measurement report (e.g., a pilot strength measurement message, PSMM) to its serving access point. As discussed above, this report includes an identifier of the target access point and the signal strength of the signal as it was received at the access terminal. In addition, as discussed in more detail below, in some cases the access terminal may include received pilot phase information in the report.

For example, the access terminal may identify the macro access points that are known to be in the vicinity of the access terminal. Here, the access terminal may repeatedly monitor for signals such as pilot signals from nearby access points and maintain a record of those macro access points from which the access terminal is able to receive signals.

As another example, the access terminal also may determine phase information associated with pilot signals the access terminal receives from nearby macro access points. This phase information may relate to, for example, the phase of a pilot PN sequence as observed at the access terminal. In some cases, the access terminal may select the pilot signal from one access point as a reference and determine the relative phase of any other received pilot signals with respect to the reference. In some aspects phase information such as this may be used to estimate the location of the access terminal since, in a synchronous system, the phase delay of a signal received at the access terminal may be indicative of the distance of the access terminal from the access point that transmitted the signal.

As represented by block 304, a determination then be may be made that the access terminal should be handed-over to the target point based on the measurement report as discussed above. This decision may be made, for example, by the serving access point and/or by a network node such as a base station controller.

As represented by block 306, a determination is also made as to whether the identifier acquired by the access terminal unambiguously identifies the target access point. If there is no identifier confusion (e.g., no other access point within the coverage area of the serving access point is assigned the identifier), the target access point is prepared for handover of the access terminal (block 308).

If it is determined that there is identifier confusion at block 306, however, the operational flow instead proceeds to block 310. Here, at least one candidate target access point may be identified based on various criteria (e.g., a historical use record). These criteria are described in more detail below in conjunction with FIG. 4A.

Briefly, in some cases information may be maintained that identifies a particular type of access point to which the access terminal is likely to go to when the access terminal is in the coverage area of the serving access point. Such an access point may include, for example, a home femto access point and/or an office femto access point. In this case, this access point (or these access points) may be identified as the candidate access point(s) at block 310.

In addition, in some cases information may be maintained that identifies the access point(s) that the access terminal has previously used (e.g., accessed). Here, if the access terminal has used a given access point in the past, it may is assumed that the access terminal may use that access point again. Hence, this access point (or these access points) may be identified as the candidate access point(s) at block 310.

In some cases there may not be any information that limits the access points to be considered at block 310. In these cases, all of the access points that are known to be assigned the confusion identifier and that are within the coverage area of the serving access point may be identified as the candidate access point(s) at block 310.

As represented by block 312, a message is sent to each access point identified at block 310. Each message comprises a request to a candidate access point to monitor for a signal from the access terminal (i.e., the access terminal that sent the report at block 302). To this end, the message may include an identifier associated with the access terminal to enable the candidate access point to acquire a signal from the access terminal. For example, the identifier may comprise a long code mask (e.g., used by the access terminal to encode or scramble its messages) or some other suitable identifier.

The receipt of such a message at a candidate access point is represented by block 314. The candidate access point then monitors for the signal (e.g., attempts to acquire the reverse link) as represented by block 316.

Figure 3B:
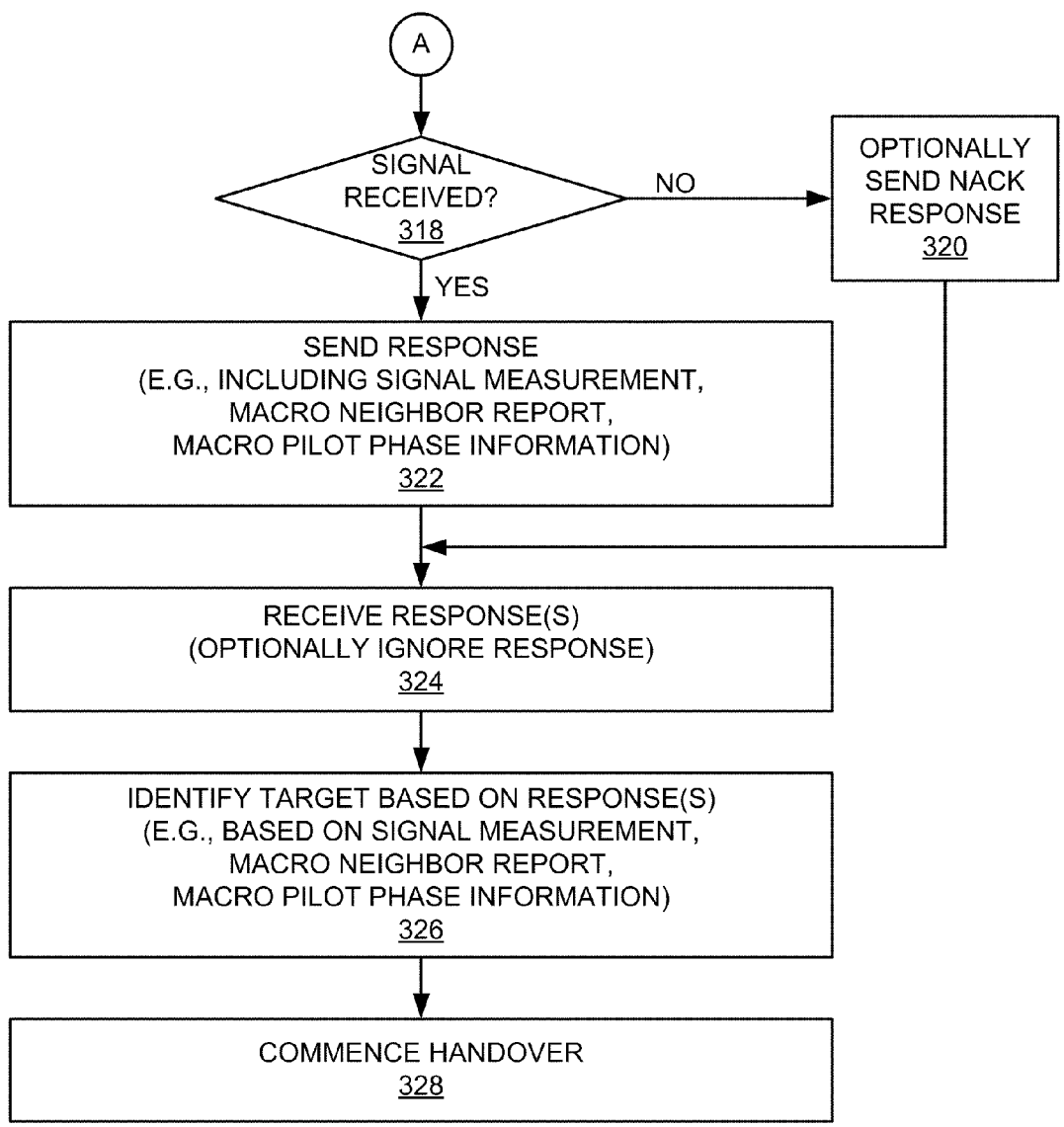

As represented by block 318 of FIG. 3B, a determination is then made as to whether the candidate access point is able to receive such a signal. If the candidate access point did not receive this signal, the candidate access point may send a negative acknowledgement (NACK) response or not send any response at block 320. In some implementations the candidate access point may send a negative acknowledgement or not send a response if there is an invalid (e.g., poor) measurement result associated with the received signal (e.g., the candidate access point measures a low signal level).

Here, it should be appreciated that it is unlikely that an access point that is relatively far away from the access terminal would be able to receive a signal (e.g., a sufficiently valid signal) from the access terminal. Such an access point may be eliminated from consideration as being the target access point given that it may be unlikely that the access terminal would have received a signal of sufficient magnitude from this far-off access point. In other words, it may be highly unlikely that the signal acquired by the access terminal at block 302 originated from this far-off access point.

Conversely, it may be expected that an access point that is relatively close to the access terminal would be able to receive a signal (e.g., a sufficiently valid signal) from the access terminal. In this case, it may be highly likely that the access terminal would have received a signal of sufficient magnitude from this nearby access point. Hence, a nearby access point such as this is likely to be the intended handover target.

As represented by block 322, in the event the candidate access point received a signal from the access terminal (e.g., a signal with a sufficient signal level), the candidate access point sends a response message that indicates the signal was received. The response may include an indication of the received signal strength of this signal as measured at the candidate access point.

The response also may include neighbor list information, received pilot phase information, and transmit power information. For example, a candidate access point may be configured to obtain information that identifies the macro access points that are in the vicinity of the candidate access point. In some cases this information may be obtained from the network (e.g., when the candidate access point is deployed or periodically). Alternatively, or in addition, in cases where the candidate access point has forward link monitoring capabilities, the access point may repeatedly monitor for signals such as pilot signals from nearby access points and maintain a record of those macro access points from which the access point is able to receive signals. In a typical case, access points (e.g., femto access points) in a network will report the above information (e.g., to a femto convergence server) at some point in time prior to sending the response. For example, this information may be reported when the candidate access point is deployed and/or periodically.

The candidate access point also may determine phase information (e.g., phase delay) associated with pilot signals the access point receives from nearby macro access points. In a similar manner as discussed above at block 302, this phase information may be used to estimate the location of the candidate access point.

The receipt of the response message(s) from the candidate access point(s) is represented by block 324 of FIG. 3. In some implementations, a negative response (e.g., a NACK response) or a response that is associated with an invalid measurement result (e.g., a response with poor measurement results from a candidate access point that measured a low signal level) may be ignored (e.g., discarded). In this way, scalability may be improved since fewer responses may need to be considered (e.g., by a network node that receives the responses) to identify the target.

As represented by block 326, the target access point is identified based on the response(s). For example, if only one valid affirmative response is received, it may be assumed that the candidate access point that sent the response is the actual target access point.

Conversely, if more than one affirmative response is received, a single target access point may be selected from the candidate access points. Here, multiple affirmative responses may be received, for example, in cases where the access terminal has a relatively high transmit power and/or in cases where the access terminal is relatively close to multiple access points that are assigned the same identifier.

In some cases the target access point is selected based on the received signal strength indications provided in the responses. For example, the candidate access point that has the highest received signal strength may be selected as the target access point.

It some cases another criterion may be used to select the target access point. For example, if comparable received signal strength indications are received from different candidate access points, this information may not resolve the confusion.

In addition, in some cases the highest received signal strength may not be a conclusive indication of the actual target access point. For example, in a case where different femto access points have different transmit powers, an access terminal that is closer to a first femto access point (that transmits at low power) may have received a stronger pilot signal from a second femto access point (that transits at a high power) that is farther away from the access terminal. Hence, the second femto access point may be the true target access point under these circumstances. However, the first access may report a higher received signal strength since it is closer to the access terminal.

In some cases the target access point is selected based, in part, on transmit power information provided in the responses. For example, by determining that one candidate access point transmits at a lower power level than another, it may be determined that some criterion other than received signal strength should be used to select the target access point.

In some cases the target access point is selected based on the phase information provided in the responses. Here, the phase information provided by the access terminal at block 302 may be compared with the phase information provided in each response (e.g., accounting for timing reference differences, as necessary). The candidate access point that provides phase information that most closely matches that of the access terminal (thereby indicating that this access point is closest to access terminal) may be selected as the target access point. Alternatively, this comparison may simply be used to eliminate the access points that have phase information that is considerably different than the phase information of the access terminal. In some aspects, such a phase information-based selection scheme may be particularly effective if the coverage of the access point is relatively small. If the coverage of the access point is large, however, such a scheme may not be as reliable.

In some cases the target access point is selected based on the neighbor list information provided in the responses. Here, the pilot measurement information provided by the access terminal at block 302 (e.g., pilot reports regularly provided by the access terminal over a period of time that identify one or more access points seen by that access terminal) may be compared with the neighbor list information provided in each response. The candidate access point that provides neighbor list information that most closely matches the pilot measurement information of the access terminal (thereby indicating that this access point is closest to access terminal) may be selected as the target access point. Alternatively, this comparison may simply be used to eliminate the access points that have a neighbor list that is considerably different than the pilot measurement information of the access terminal.

As represented by block 328, once the target access point is identified, appropriate operations are commenced to complete the handover of the access terminal to the target access point.

As mentioned above, confusion resolution as taught herein may be based on historical use records and/or involve a tier-based resolution scheme. Several examples of these aspects of the disclosure will be described with reference to FIG. 4A.

As represented by block 402, historical use information may be maintained in a system by tracking certain events associated with access terminals and/or access points in the system. This information may be stored in a memory device in various ways including, for example, as a simple data record or as entries in a formal database.

In some aspects the tracked events may be indicative of which access points have been or will be used by which access terminals. In some cases the system may be informed whenever an access terminal is first associated with a home femto access point. In some cases the system may track registration operations by an access terminal to determine where the access terminal has previously registered. In some cases the system may update a database entry each time an access terminal originates, terminates or hands-over a call with a given femto access point. In some cases the system may track handover operations to determine where a given access terminal is usually handed-over upon reporting a given identifier. For example, each time a handover is requested, the system may update handover counts and success rates. This may be useful in some aspects for algorithm evaluation, tier classification, and system configuration quality (e.g., identifier assignment algorithm assessment). In some cases, information acquisition as taught herein may be implemented in conjunction with billing record generation. In some cases, when a femto access point is activated, the system may learn the identifier (e.g., pilot PN offset) and macro neighbor list of the femto access point. It should be appreciated that other techniques may be employed to determine whether, when, or how frequently a given access terminal has accessed (or attempted to access) one or more access points.

Figure 4A:
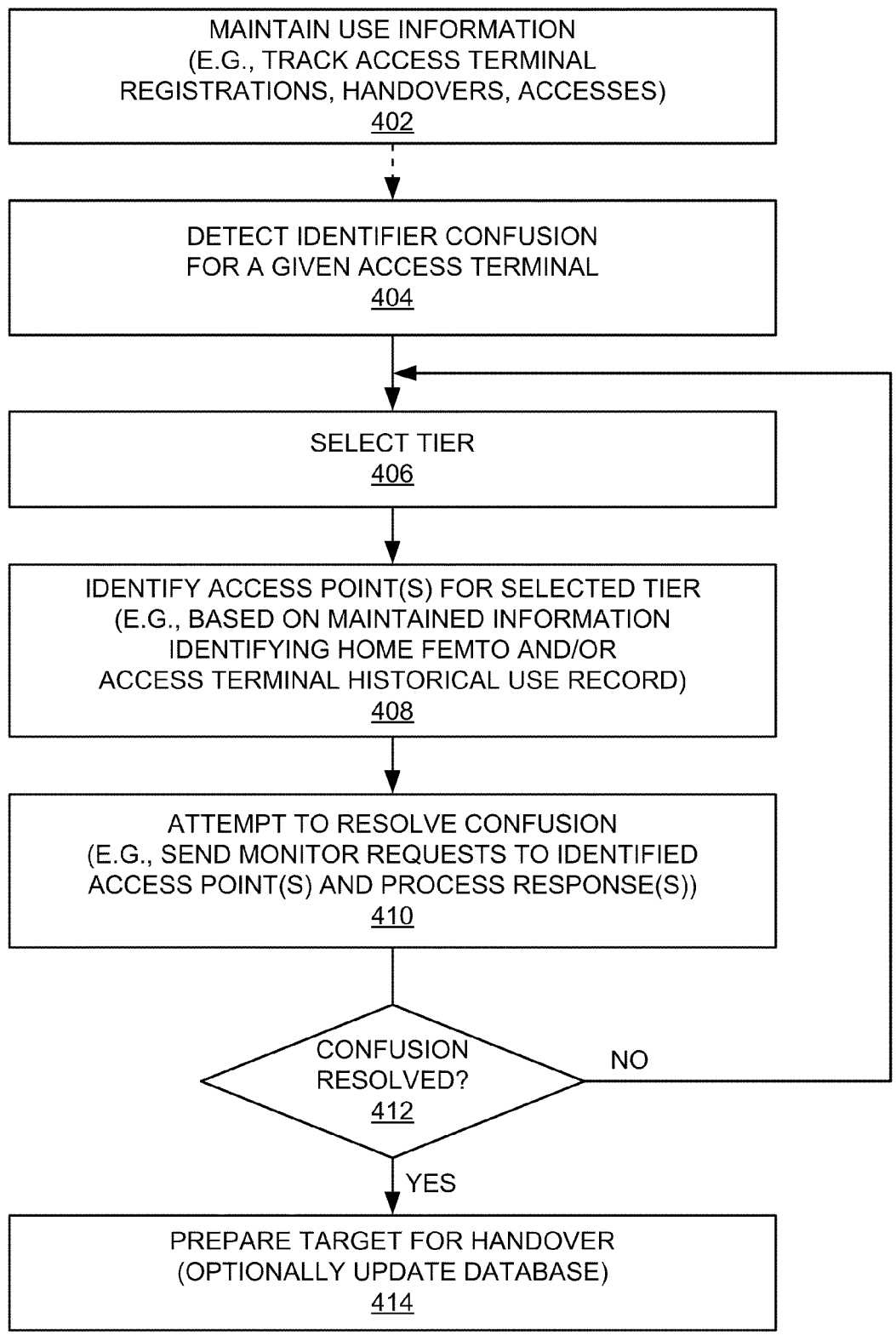
FIG. 4A is a flowchart illustrating several sample aspects of operations that may be performed to maintain a historical use database and provide tiered confusion resolution.
Figure 4B:
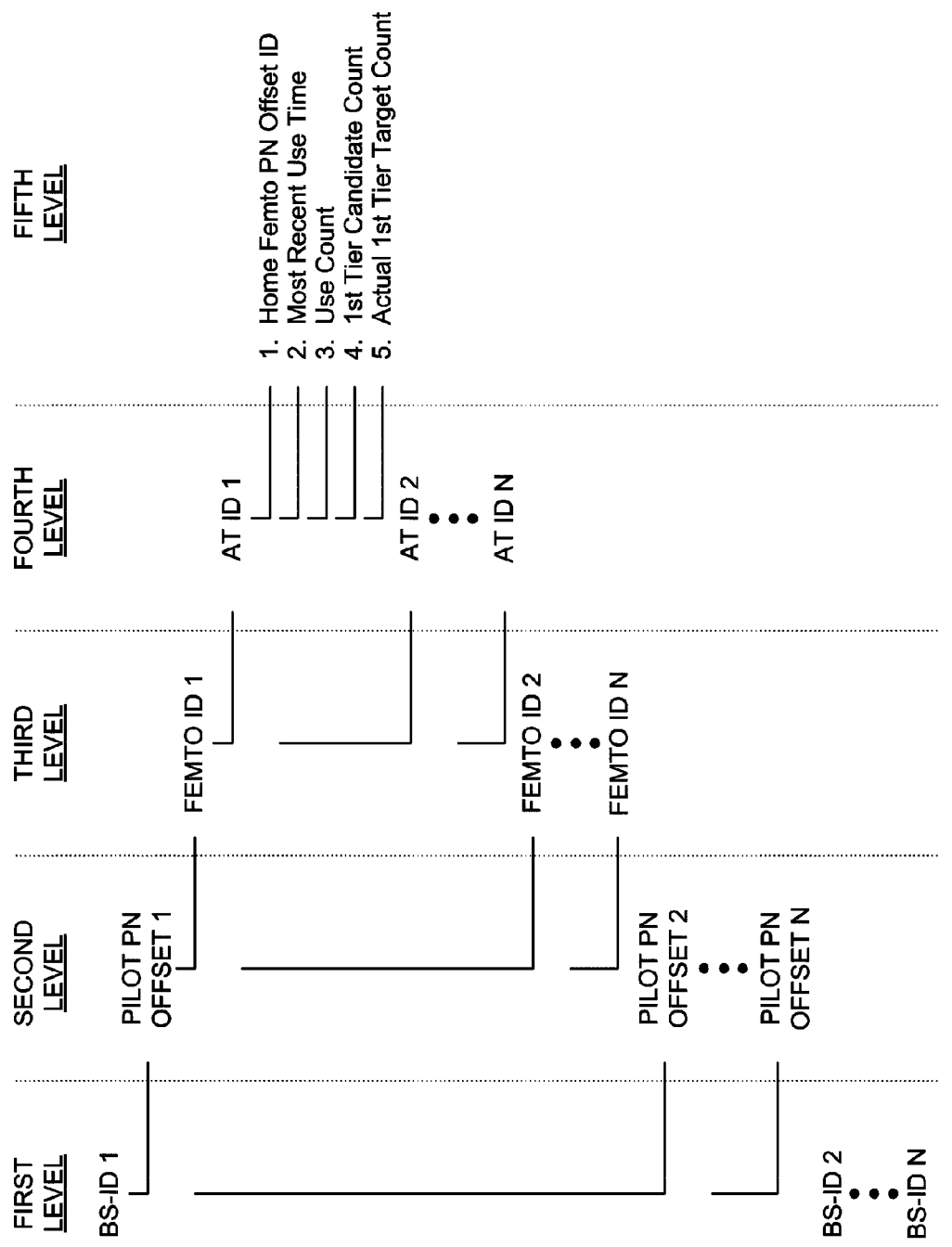
FIG. 4B is a simplified diagram illustrating a sample database structure.

An example of a database structure follows with reference to FIG. 4B. At a first (highest) level of the database structure, the database includes one or more macro access point entries. In this way, information about access terminal usage within the coverage area of a given macro access point in the system may be tracked. Each of the macro access point entries may be identified by a corresponding unique macro access point identifier (e.g., base station IDs: BS-ID 1, BS-ID 2, etc.). When a femto access point has multiple macro access point neighbors, database information for that femto access point within the coverage area of a given macro access point may be accessed using the corresponding macro access point identifier.

Each macro access point entry includes second level entries for different femto access point identifiers of a first type (e.g., pilot PN offsets, PCIs). For example, the first time such an identifier is used within the coverage area of a given macro access point, a second level entry (e.g., PILOT PN OFFSET 1) may be created for that identifier under the first level entry for that macro access point (e.g., BS-ID 1). Any subsequent use of the identifier may then result in the identifier entry being updated.

Each femto access point identifier entry, in turn, includes third level entries for different femto access point identifiers of a second type (e.g., unique identifiers such as CGIs). For example, when a femto access point that is assigned a given pilot PN offset (e.g., PILOT PN OFFSET 1) is used within the coverage area of a given macro access point, a third level entry (e.g., FEMTO ID 1) may be created for the unique identifier assigned to that same access point. In this way, information may be maintained regarding the different access points that use the same pilot PN offset within the coverage area of a given macro access point.

Each third level femto access point identifier entry, in turn, includes fourth level entries for different access terminals that use that specific access point. For example, when an access terminal accesses a given femto access point within the coverage area of a given macro access point, a fourth level entry (e.g., AT ID 1) may be created for that access terminal. In this way, information may be maintained regarding the different access terminals that use particular access points within the coverage area of a given macro access point. Each of the access terminal entries may be identified by a corresponding unique access terminal identifier.

Each access terminal entry, in turn, includes fifth level entries relating to access point use by that access terminal. For example, one entry (e.g., entry 1) may identify the home femto access point(s) for that access terminal. One entry (e.g., entry 2) may indicate the most recent time (e.g., time of day and/or date) that the access terminal accessed the corresponding access point (corresponding to level three of this branch of the structure). One entry (e.g., entry 3) may indicate how many times the access terminal accessed the corresponding access point. One entry (e.g., entry 4) may indicate how many times (e.g., a lifetime count) the access terminal was a first tier handover candidate. One entry (e.g., entry 5) may indicate how many times (e.g., a lifetime count) the access terminal was correctly identified as a first tier handover candidate. Similar handover candidate entries may be provided for a second tier, a third tier, etc.

Various provisions may be employed to maintain the database. For example, if a femto access point location changes, the records for that femto access point may be started anew. Also, if the size of the database becomes excessive, staler entries may be removed in favor of newer entries.

For purposes of illustration, an example of how database information may be used in a scheme that uses a tiered set of criteria for identifying candidate target access points follows. In this example, different sets of candidate target access points are defined for each tier, whereby the access points in the tiers may be requested to monitor for a signal from the access terminal on a tier-by-tier basis. Here, in the event the operations for a given tier do not resolve identifier confusion, broader targeting may be employed at the next tier. The operations of a given tier may fail to resolve the confusion because, for example, there was no handover candidate at that tier that was able to receive a signal from the access terminal. Similarly, under various conditions a given tier may be skipped (e.g., if there is no record for that tier that is helpful in reducing ambiguity).

Four tiers are defined in the example that will now be described with reference to FIG. 4A. In the first tier, the set of candidate access points consists of the home femto access point of the access terminal. In the second tier, the set of candidate access points consists of the access points that the access terminal has used in the past. In the third tier, the set of candidate access points consists of femto access points that have a neighbor list that matches the pilot measurement reported by the access terminal. Alternatively, the third tier consists of the access points that have similar pilot phase information with the pilot measurement reported by the access terminal. In the fourth tier, the set of candidate access points consists of all other femto access points that have been assigned the confusing identifier and that have the serving macro access point for the access terminal as a neighbor. In some aspects, each of the tiers may be defined to only identify access points that the access terminal is allowed to access (e.g., corresponding to an associated closed subscriber group). For example, if an access point is restricted and the access terminal does not have permission to access that access point, that access point will not be included in a tier entry.

As represented by block 404 of FIG. 4A, at some point in time it may be determined that an identifier reported by an access terminal is subject to confusion. The first confusion resolution tier (highest tier) may then be selected at block 406.

As represented by block 406, one or more candidate target access points are selected based on the tier 1 criterion or criteria. In this example, tier 1 involves selecting the home femto access point for the access terminal.

As represented by block 408, an attempt is made to resolve the confusion based on the tier 1 criterion or criteria. In this case, a request to monitor for a signal from the access terminal is sent to the home femto access point identified at block 406. A target determination may then be made based on whether a response is received and, if so, the result of that response. For example, if the home femto access point received the signal from the access terminal, it may be determined that the home femto access point is the intended target (which will typically be the case) and, hence, the confusion is deemed resolved. Conversely, if the home femto access point did not receive the signal, the confusion has not been resolved.

As represented by block 412, if the confusion has been resolved, the operational flow proceeds to block 414. Here, the target identified at block 410 is prepared for handover and the handover operations may proceed as discussed herein.

In the event the confusion was not resolved based on the first tier operations, as represented by blocks 412 and 406, the next (second) tier may be selected. Continuing with the above example, a monitor request may be sent to each femto access point of the set of femto access points that the access terminal previously used. If only one of these access points sends a response indicating that the signal was received from the access terminal, it may be deemed that the confusion is resolved. However, if more than one access point sends a response indicating that the signal was received, further processing may be performed to narrow the number of candidate targets. For example, the received signal strength indications sent with the responses may be compared in an attempt to determine which access point is closest to the access terminal (and, hence, is most likely to be the target).

In the event the confusion was not resolved based on the second tier operations, the third tier may be selected as the process flow again proceeds from block 412 to block 406. Here, a monitor request may be sent to each femto access point of the set of femto access point that have a neighbor list that matches the pilot measurement information of the access terminal. As above, the confusion may be deemed resolved if only one affirmative response is received while further processing may be performed if multiple affirmative responses are received.

In the event the confusion was not resolved based on the third tier operations, the fourth tier may be selected as the process flow again proceeds from block 412 to block 406. Here, a monitor request may be sent to each femto access point of the set of femto access points that have the same identifier and have the macro access point as a neighbor. As above, the confusion may be deemed resolved if only one affirmative response is received while further processing may be performed if multiple affirmative responses are received.

As represented by block 414, the database may be updated at some point during the operations of FIG. 4A based on the result of these operations. For example, if a given access point was identified as a second tier candidate access point, a corresponding database entry may be updated. Also, if the access terminal was successfully handed-over to a particular access point, another database entry may be updated.

The operations of multiple tiers may be combined in some cases. For example, phase information and/or neighbor lists provided by candidate access points may be compared to the corresponding information provided by the access terminal to reduce ambiguity at a given tier, to prune candidate access points, or to double-check the candidate access points identified by at least one other tier. In this case, the comparison may be used to determine which access point is closest to the access terminal (e.g., through the use of triangulation techniques).

The operations described above may be performed by various entities in a network. For example, in some implementations confusion resolution operations (e.g., one or more of blocks 208, 310, 312, 324, 326, and 406-412) may be performed by a network node (e.g., a femto convergence server (FCS) or femto mobile switching center (F-MSC)) that manages mobility operations for a set of femto access points in the network. In other implementations one or more of these operations may be performed by some other type of node (e.g., an access point controller or access point).

Figure 5:
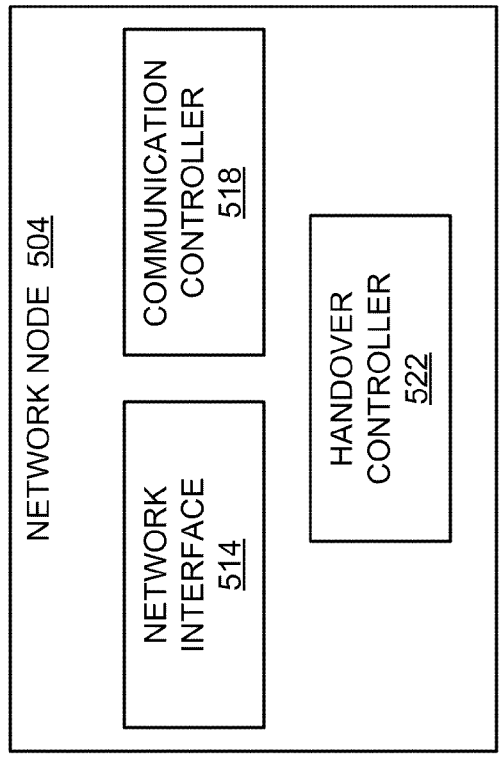
FIG. 5 is a simplified block diagram of several sample aspects of components that may be employed in communication nodes.
Figure 5:
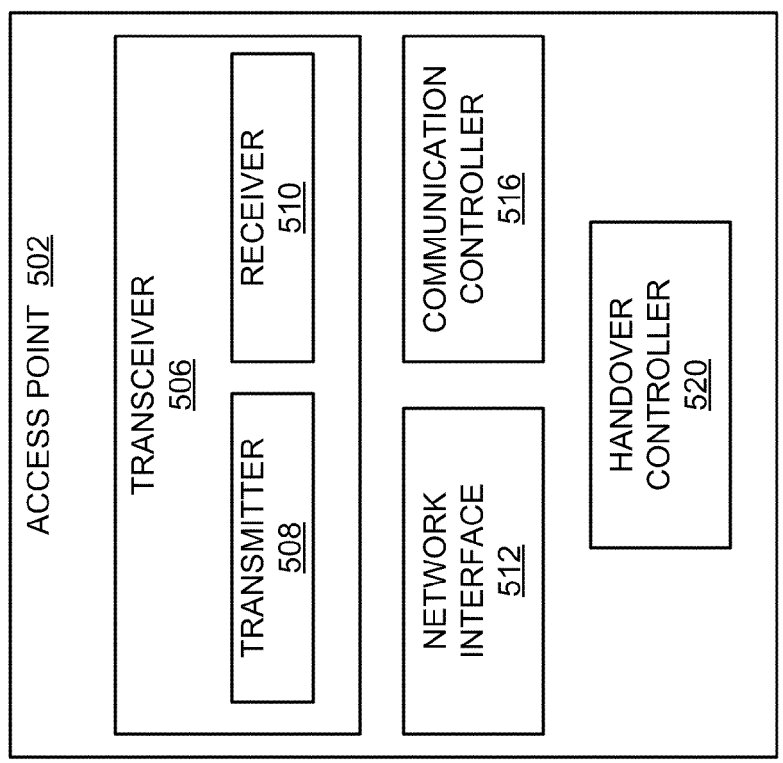

FIG. 5 illustrates several sample components that may be incorporated into nodes such as an access point 502 and a network node 504 to perform confusion resolution operations as taught herein. The described components also may be incorporated into other nodes in a communication system. For example, other nodes in a system may include components similar to those described for the access point 502 and the network node 504 to provide similar functionality. Also, a given node may contain one or more of the described components. For example, an access point may contain multiple transceiver components that enable the access point to operate on multiple frequencies, operate on different types of links (e.g., uplink and downlink), and communicate via different technologies.

As shown in FIG. 5, the access point 502 includes a transceiver 506 to facilitate wireless communication with other nodes. The transceiver 506 includes a transmitter 508 for sending signals (e.g., pilot signals and other signals) and a receiver 510 for receiving signals (e.g., measurement reports and other signals).

The access point 502 and the network node 504 include network interfaces 512 and 514, respectively, for communicating with other network nodes (e.g., sending and receiving monitor requests and responses). For example, each network interface may be configured to communicate with one or more network nodes via a wired or wireless backhaul.

The access point 502 and the network node 504 also include other components that may be used in conjunction with confusion resolution operations as taught herein. For example, the access point 502 and the network node 504 may include communication controllers 516 and 518, respectively, for managing communication with other nodes (e.g., sending and receiving messages, reports, responses, and other information) and for providing other related functionality as taught herein. In addition, the access point 502 and the network node 504 may include handover controllers 520 and 522, respectively for performing handover-related operations (e.g., determining whether and how to perform a handover, determining whether there is confusion and resolving the confusion, identifying access points for handover, sending and receiving messages) and for providing other related functionality as taught herein.

Figure 6:
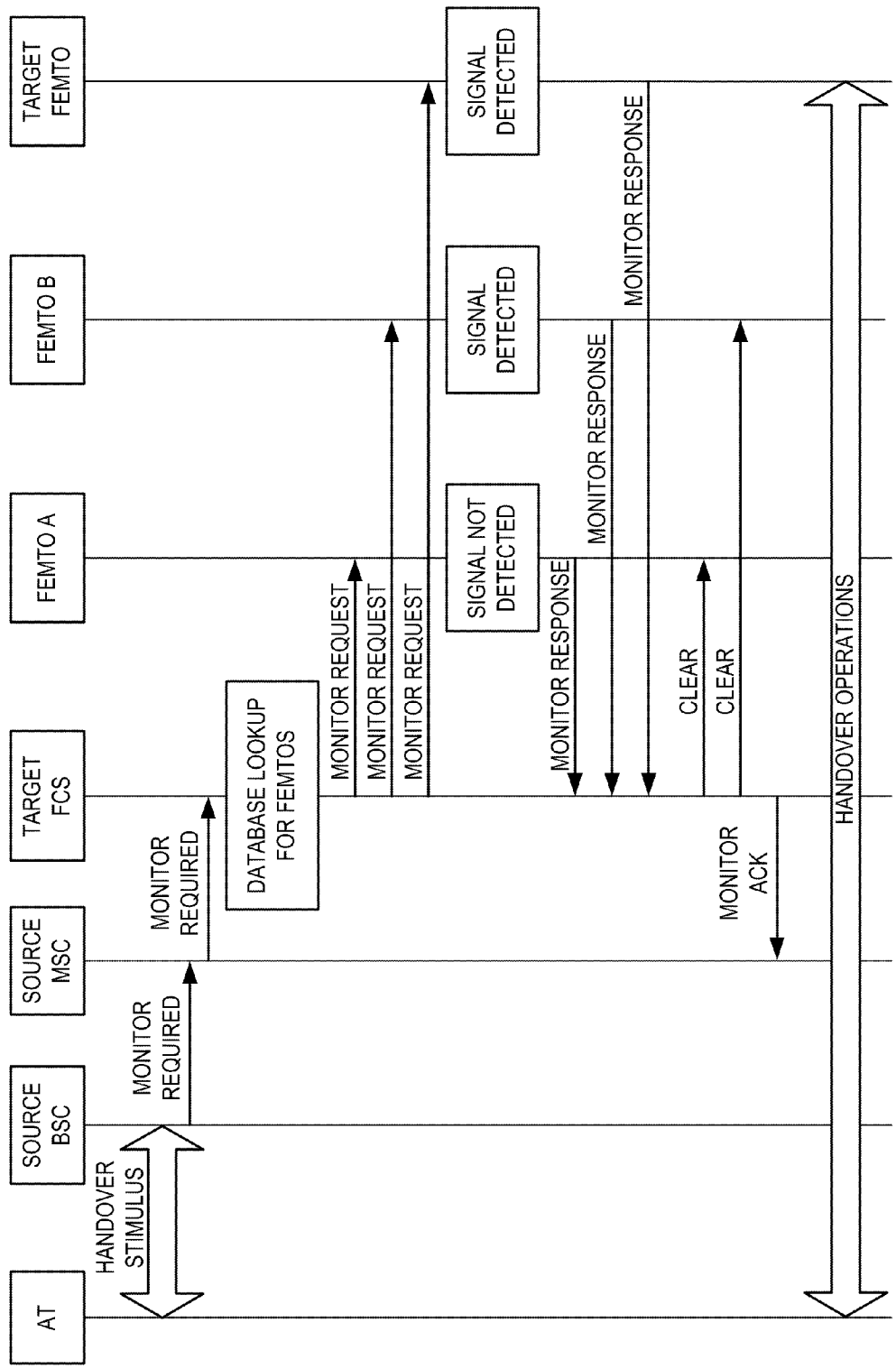
FIG. 6 is a simplified call flow diagram of a sample handover procedure.

Referring to FIG. 6, for purposes of explanation, an active state handover (e.g., hand-in) procedure will be described in detail in the context of a 3GPP2 system. It should be appreciated that the teachings herein may be applicable to other types of system (e.g., LTE, UMTS, etc.).

Initially, a handover stimulus may involve a macro base station controller (source BSC) receiving a PSMM from an access terminal (AT). This report includes the PN offset the AT acquired from a target femto. Upon determining that the PN offset is associated with a femto access point, the macro network (e.g., by operation of the source BSC and MSC) initiate handover by requesting the assistance of the femto system (e.g., the target FCS) in resolving the PN offset to a unique target ID (e.g., cell global identification). This request (e.g., femto monitor required) may include the PN offset reported by the AT, a mobile identifier of the AT, a long code mask used by the AT on the reverse link, an identifier of the serving access point (not shown in FIG. 6), and, optionally, other information (e.g., a neighbor list, etc., as described herein).

In response to the request, the target FCS conducts a database lookup for candidate femto access points that are assigned the PN offset. This lookup may involve the use of various parameters (e.g., home femto identifiers, use information, phase information, neighbor lists) as taught herein. In addition, this lookup may involve a tiered scheme as taught herein. Thus, the target FCS may first determine whether the home femto access point has the confusing identifier at tier 1, then determine if any femto access points previously used by the AT have the confusing identifier at tier 2, and so on. In the event the AT is repeatedly handed-over between a given femto access point and the source BSC, this scenario may be detected, whereby the set for a tier (e.g., the second tier) may be reduced to a signal candidate femto access point.

In the example of FIG. 6, the target FCS sends a request to three femto access points to monitor (e.g., acquire) the reverse link. Each of these requests includes the long code mask for the reverse link. The femto access points then monitor the reverse link to detect the AT. The femto access points that detect the AT (two access points in this example) make signal measurements on the reverse link.

Next, each of the femto access points sends a response (e.g., femto monitor response) to the target FCS. Each of the responses from the femto access points that detected the AT includes an identifier of the femto access point (e.g., cell global identification), an indication that the monitoring was successful, and the reverse link signal measurement. The response from the femto access point that did not detect the AT may include an identifier of the femto access point and an indication that the monitoring was unsuccessful.

The target FCS identifies the target access point based on the received reverse link signal measurement values and/or in some other criterion or criteria. The target FCS may then send a clear command to the other two access points so that those access points may de-allocate their resources.

The target FCS also sends an acknowledgement (e.g., femto monitor ack) to the macro network (e.g., the source MSC). This message may include, for example, the status of the monitoring (e.g., success or failure), the identifier of the identified target femto, a mobile identifier of the AT, and, optionally, other information. The macro network may then proceed with handover operations so that the AT is directed to the target femto access point.

In view of the above it may be seen that various advantages may be provided by a system constructed in accordance with the teachings herein. In some aspects, such a system may provide scalability without adding excessive complexity to the system. For example, the described schemes may allow for mass deployment of femto access points since the resulting identifier ambiguity may be adequately resolved. Also, the described handover procedures enable identifier ambiguity to be resolved with little impact on the system architecture and on the macro system. For example, handovers may be achieved without excessive network resource usage, and streamlined signaling procedures may be employed. Also, no base station or radio interface changes may be required to implement the described confusion resolution scheme on a legacy system. For example, for a legacy 3GPP2 system, there may be little or no effect on the A/Abis interface in the macro system, there may only be two new messages (e.g., femto monitor required and femto monitor ack) added between the macro system and the femto system, and there may be no major effect on BSC procedures.

As mentioned above, confusion associated with handover of a given access terminal may be resolved by maintaining a record of the access points that the access terminal previously accessed and using that information to identify one or more candidate access points for the handover. For example, a situation may occur where an access terminal X is to be handed-over from a macro access point Y to a femto access point Z, but it is determined that PCI z (broadcast by femto Z) is confusing. There are many ways of resolving the confusion of PCI z (e.g., through asking the access terminal to report the global cell ID of femto access point Z). Once the confusion is resolved, macro access point Y will know that "access terminal X went from macro access point Y to femto access point Z". In practice, it is quite likely that access terminal X will repeat this path in the future since a given access terminal is typically associated with only a small number of femto access points. For example, the majority of the times that access terminal X ends up on a femto access point is when access terminal X is going home or to a favorite coffee shop. To anticipate such a future event, macro access point Y may cache information indicating that "For access terminal X, PCI z typically resolves to femto access point Z". In some cases macro access point Y may cache information about several optional femto access points Z1, Z2, . . . Zk if access terminal X tends to visit multiple targets that are assigned the same PCI.

Macro access point Y may then use the cached information in the event access terminal X reports PCI z at some point in the future. That is, if macro access point Y receives PCI z from access terminal X in a measurement report, macro access point Y prepares femto access point Z (or femto access points Z1, Z2, . . . Zk) since the past history for access terminal X indicates that femto access point Z (or one of femto access points Z1, Z2, . . . Zk) is probably the intended target. Such a scheme may be useful when the preparation of a large number of targets is not feasible due to resource or other constraints (i.e., where it is desirable to only prepare a limited number of targets).

A history-based scheme also may be useful in a case where a macro access point does not know the use history of a specific access terminal X. For example, a macro access point Y may use statistics based on information that was cached for other access terminals regarding a likelihood of how often the other access terminals tend to visit target femto access points Z1, Z2, . . . Zk when being handed-over from macro access point Y. Based on this statistical information, macro access point Y may prepare one or more of Z1, Z2, . . . Zk when attempting to handover access terminal X. The number of such femto access points that macro access point Y prepares may be limited by resource constraints, by configuration, or any other method.

Sample operations that may be performed to provide access terminal-specific use-based confusion resolution such as this will now be described in some detail in conjunction with the flowcharts of FIGS. 7-9. Briefly, FIG. 7 describes operations that may be performed at a node such as a source access point to handover an access terminal FIG. 8 describes operations that may be performed in conjunction with maintaining (e.g., creating and updating) a use information database. FIG. 9 describes operations that may be performed to resolve confusion based on statistical information.

Figure 7:
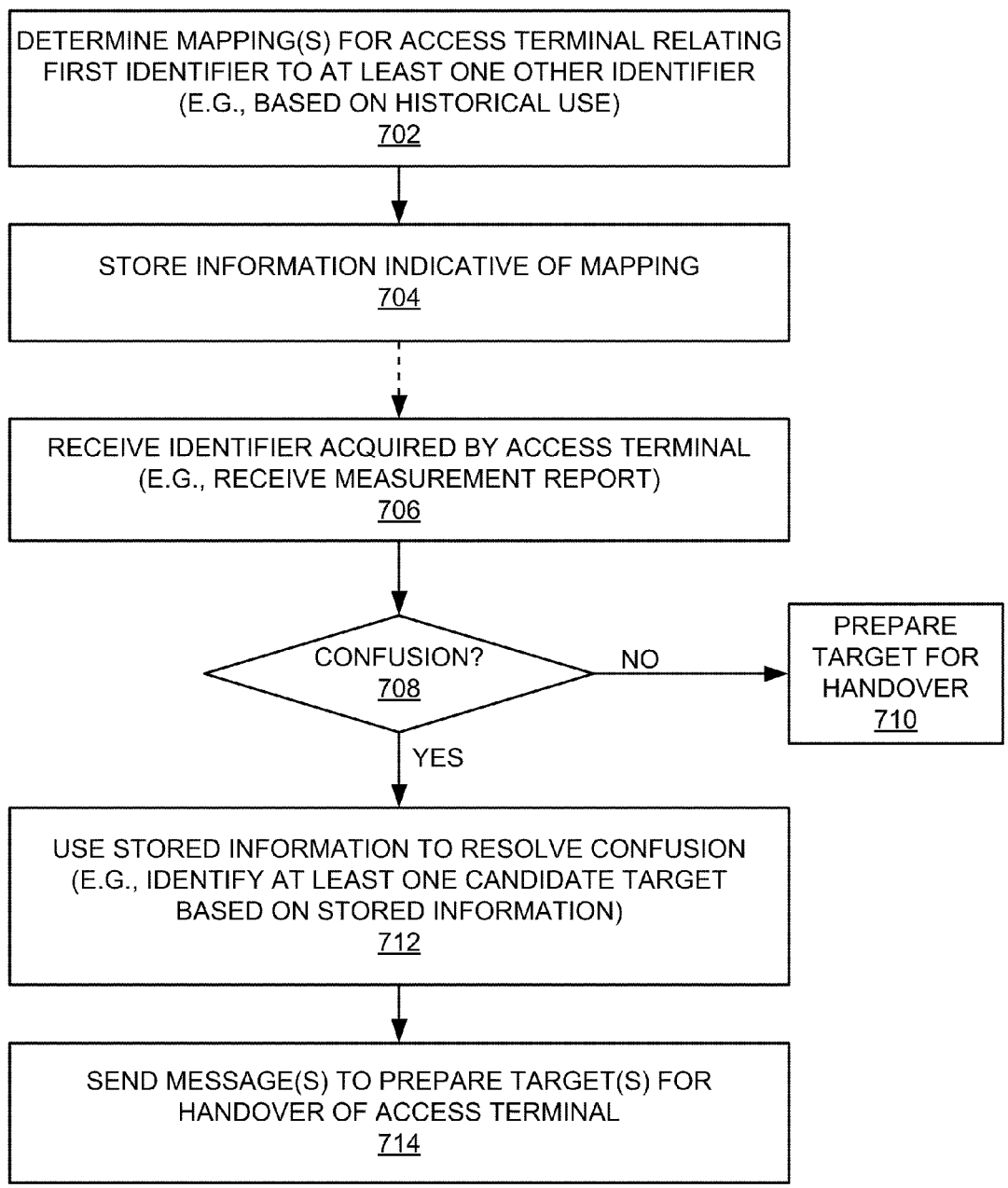
FIG. 7 is a flowchart illustrating several sample aspects of operations for performing a handover while resolving confusion through the use of access terminal-specific mapping.

As represented by block 702 of FIG. 7, at some point in time a mapping is determined, wherein the mapping maps a first access point identifier (e.g., PCI) used by an access terminal to identify a target access point with another access point identifier (e.g., CGI) that more uniquely identifies the intended target access point. As mentioned above, this mapping may be based on historical use information acquired for the access terminal. For example, the mapping may indicate that when the access terminal X reports PCI z to macro access point Y, the access terminal is usually (or always) handed-over to femto access point Z. Similar mappings may be determined for this access terminal for this same first identifier (i.e., mappings to other second identifiers associated with other femto access points) in situations wherein the access terminal has accessed more than one access point with the same identifier. Similar mappings also may be determined for this access terminal for other first identifiers (i.e., mappings to another set of other second identifiers). In addition, similar mappings may be determined for other access terminals that have reported a first identifier to macro access point Y.

As represented by block 704, information indicative of each mapping determined at block 702 is stored in a memory device. In some implementations the operations of blocks 702 and 704 are performed at each macro access point in a network. Hence, mapping information may be maintained at each of these macro access points.

The historical use information used to create the above mappings may be obtained in various ways. Several examples of how such information may be obtained during the course of standard operations will be described with reference to FIGS. 8A-8C.

Figure 8A:
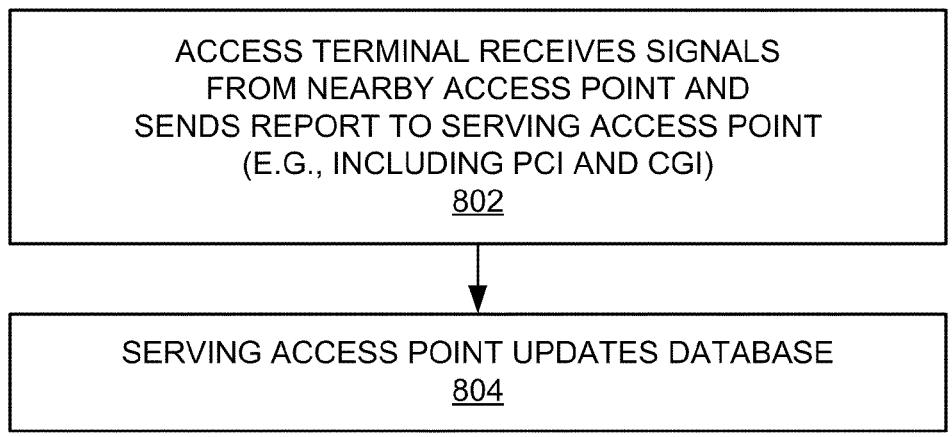
FIGS. 8A, 8B, and 8C are flowcharts illustrating several sample aspects of operations that may be performed in conjunction with determining access terminal-specific mapping.
Figure 9:
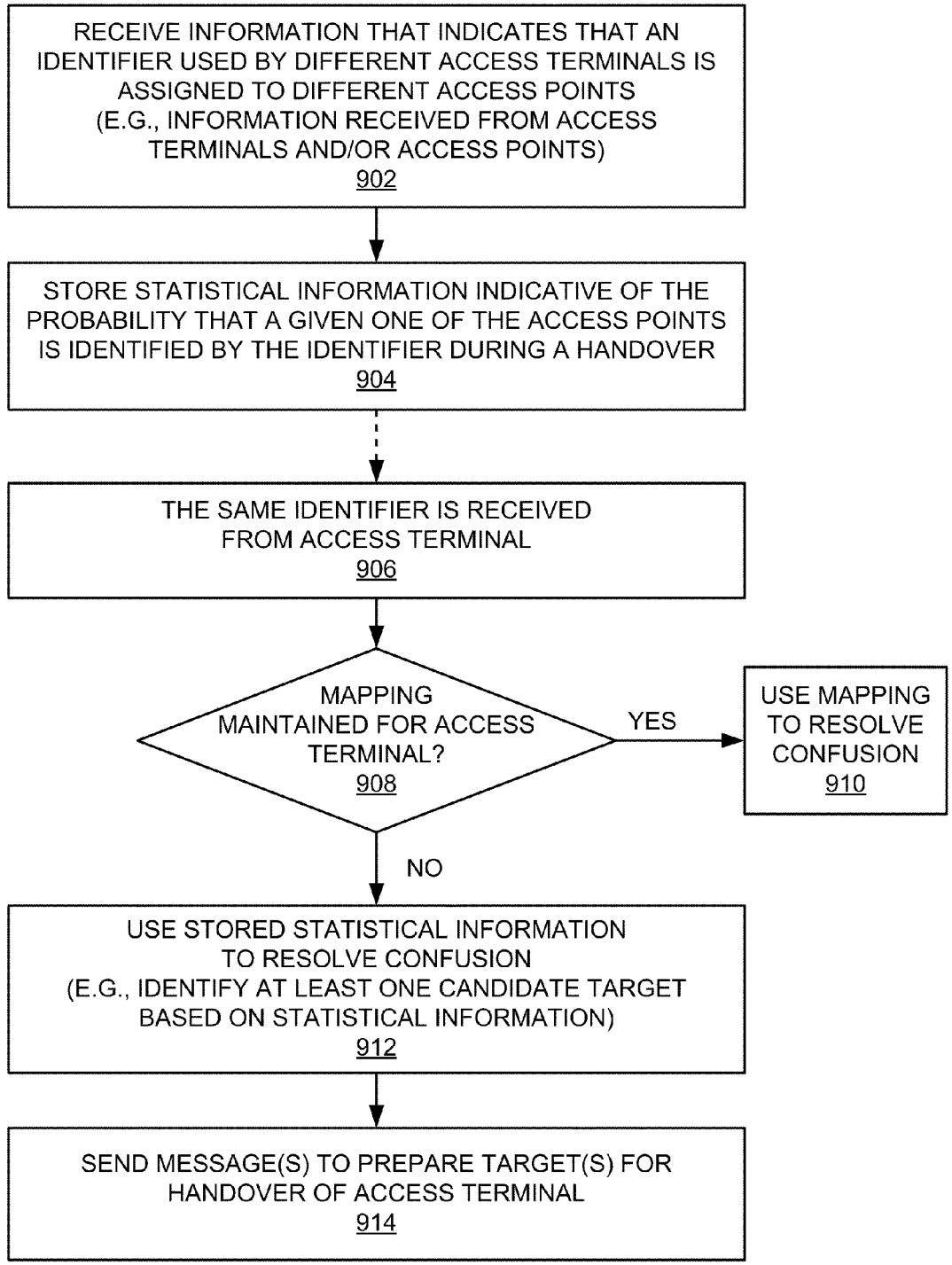
FIG. 9 is a flowchart illustrating several sample aspects of operations for performing a handover while resolving confusion through the use of statistical information.

As represented by block 802 of FIG. 8A, as an access terminal travels throughout a network, the access terminal may receive signals (e.g., pilot signals) from nearby access points. The access terminal may then report receipt of these signals (e.g., via a measurement report) to its serving access point.

In some cases, the access terminal may acquire more than one type of identifier from a nearby access point. For example, the access terminal may acquire both the PCI and the CGI from the nearby access point. In such a case, the access terminal may elect to report both of these identifiers to its serving access point.

Accordingly, as represented by block 804, the serving access point may update its database based on the identifiers provided in the report. Thus, in some cases an access terminal-specific mapping between two identifiers may be determined based solely on identifier information provided by the access terminal via a measurement report or some other similar report.

Figure 8B:
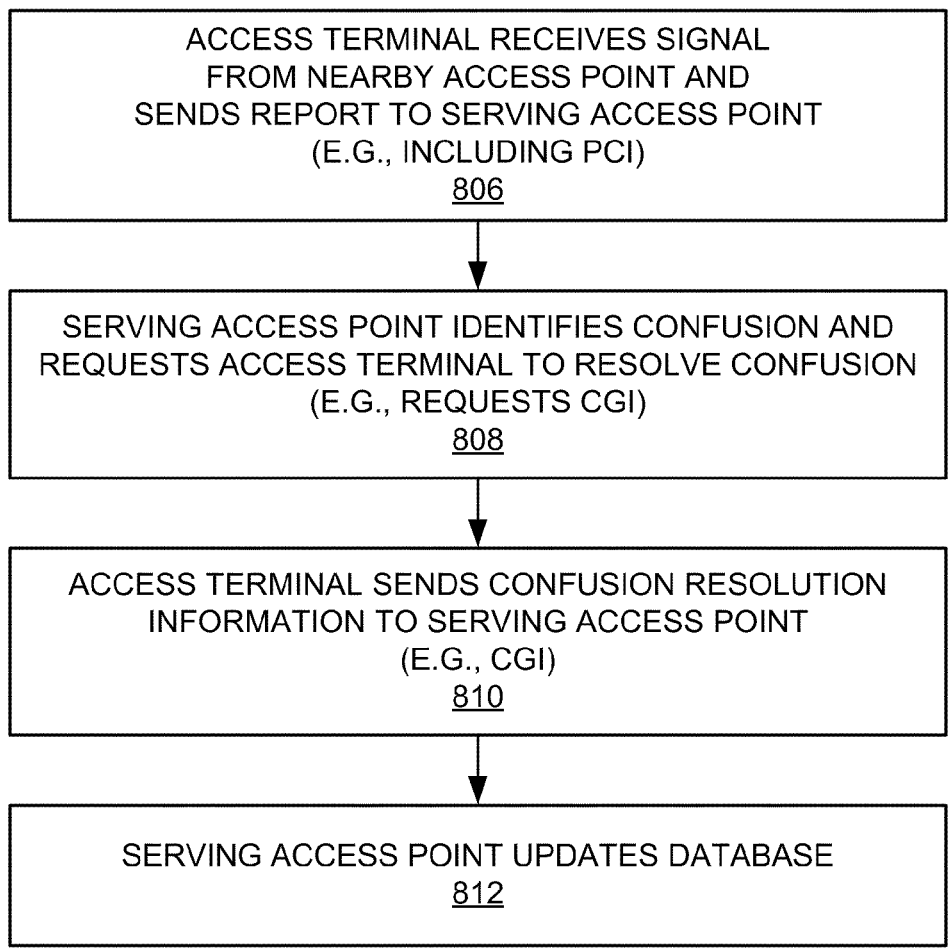

Referring now to FIG. 8B, in some cases the serving access point requests the assistance of the access terminal to resolve confusion. For example, as represented by block 806, an access terminal may provide a measurement report (or some other report) that only includes a first identifier (e.g., PCI) of a target access point. As represented by block 808, the serving access point may determine that there is confusion associated with the use of this first identifier and send a request to the access terminal to monitor for a second identifier (e.g., a more unique identifier such as a CGI) from the target access point to resolve the confusion. Upon acquiring this information (if possible), the access terminal sends the requested confusion resolution information to the serving access point at block 810 (e.g., via another measurement report including the CGI). The serving access point may then update its database based on the identifiers provided in the reports (block 812).

Figure 8C:
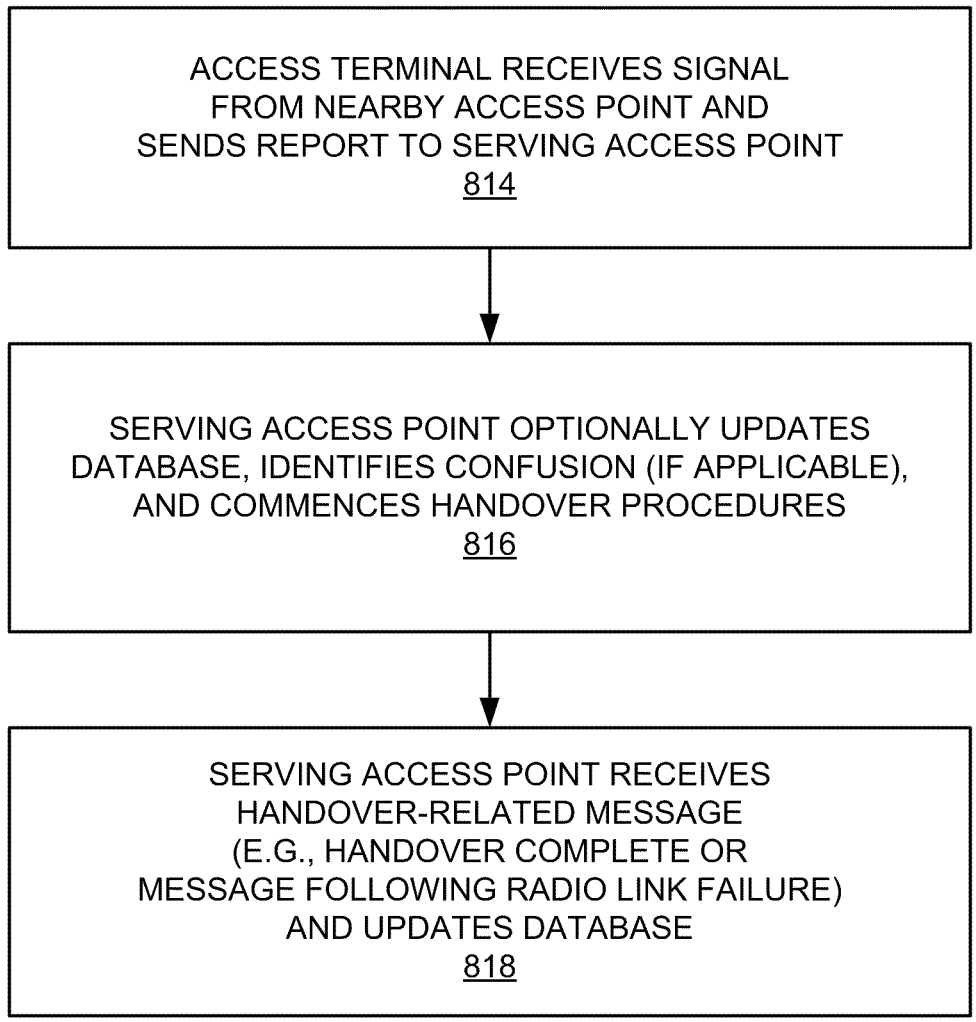

FIG. 8C illustrates another case where the measurement report (or some other report) provided by an access terminal at block 814 only includes a first identifier (e.g. PCI) of a target access point. In this case, the serving access point may update its database to maintain a record indicating that this particular access terminal has reported a given identifier (block 816).

In addition, the serving access point for the access terminal may determine that there is confusion associated with this identifier. Here, the access terminal may perform appropriate procedures to resolve this confusion in an attempt to handover the access terminal to the desired target (e.g., prepare multiple targets for handover as discussed herein).

As represented by block 818, the serving access point may obtain information about a second identifier associated with the recorded first identifier in the event the access terminal ends up at the target access point after reporting the identifier to the serving access point. For example, if the access terminal is successfully handed-over to a target access point, the serving access point may receive a handover-related message (e.g., a handover complete message) from the target access point that provides the second identifier of the target access points. Thus, this message may be used to determine that when the access terminal reports a given first identifier, the access terminal ends up being handed over to an access point having the second identifier.

Alternatively, in some cases the access terminal experiences a radio link failure (RLF) after reporting the first identifier and ends up connected to the target access point after recovering from the RLF. In these cases, the serving access point may receive a message (e.g., an RLF report or an explicit context fetch) from the target access point that indicates that the access terminal ended up there. In either case, the serving access point may update the database based on the second identifier included in the received message.

Referring again to FIG. 7, at some point in time after the mapping information has been maintained at blocks 702 and 704, an access terminal reports an identifier as represented by block 706. If there is no confusion for this identifier at block 708, the corresponding target access point is prepared for handover of the access terminal (block 710).

In the event confusion was identified at block 708, the stored mapping information is used to resolve the confusion at block 712. For example, as discussed above, the access point at which the access terminal typically ends up after reporting the identifier may be identified as a candidate access point. Alternatively, in the event the access terminal has, on different occasions, ended up at different ones of a set of access points having the same first identifier, each of the access points in the set may be identified as a candidate access point. In this way, the access terminal may be successfully handed-off to one of these candidate access points. The other candidate access points may then deallocate resources once they determine (e.g., after a timeout period) that the access terminal is not being handed-over to them.

As represented by block 714, appropriate messages may then be sent to each of the candidate access points identified at block 712 to prepare the candidate access point(s) for handover of the access terminal. In some implementations, neighbor access points of the candidate access points also may be prepared for handover of the access terminal.

FIG. 9 describes sample operations that may be performed, for example, in a situation where there is no prior use information available for an access terminal to be handed-over. In this case, confusion resolution is resolved through the use of a probability based on the history of access terminals that have used the same identifier.

As represented by block 902, at various point in time a node (e.g., a macro access point) receives information that indicates that different access terminals in the node's coverage area may use the same identifier (e.g., a PCI) to identify different target access points. This information may be acquired, for example, in a similar manner as described in FIG. 8.

As represented by block 904, statistical information is provided (e.g., generated) based on the information acquired at block 902 and stored in a memory device. In some implementations the statistical information (e.g., a statistical distribution) is indicative of the probability that a given one of the access points that have the confusing identifier is the intended target during a given handover directed to that identifier. For example, a first access point may have ended up as the target 40% of the time that the identifier was reported to a macro access point, a second access point may have ended up as the target 30% of the time that the same identifier was reported to the macro access point, and so on. Here, it is noted that different access terminals may have reported the different target access points.

As represented by block 906, at some point in time after the statistical information has been maintained at blocks 902 and 904, an access terminal reports the same identifier. As represented by blocks 908 and 910, if a mapping is maintained for this access terminal, the mapping may be used to resolve confusion for this access terminal (e.g., as discussed above at FIG. 7).

As represented by block 912, if a mapping is not maintained for this access terminal, the stored statistical information may instead be used to resolve confusion for this access terminal. For example, if the statistical information indicates that one femto access point ends up being the target 90% of the time that the confusing identifier was reported to a macro access point, a decision may be made to designate this femto access point as the candidate access point for handover of the access terminal Conversely, if the statistical information indicates that two femto access points end up being the target 85% of the time that the confusing identifier was reported to this macro access point, a decision may be made to designate each of these femto access points as a candidate access point for handover of the access terminal.

As represented by block 914, appropriate messages may then be sent to each of the candidate access points identified at block 912 to prepare the candidate access point(s) for handover of the access terminal.

Figure 10:
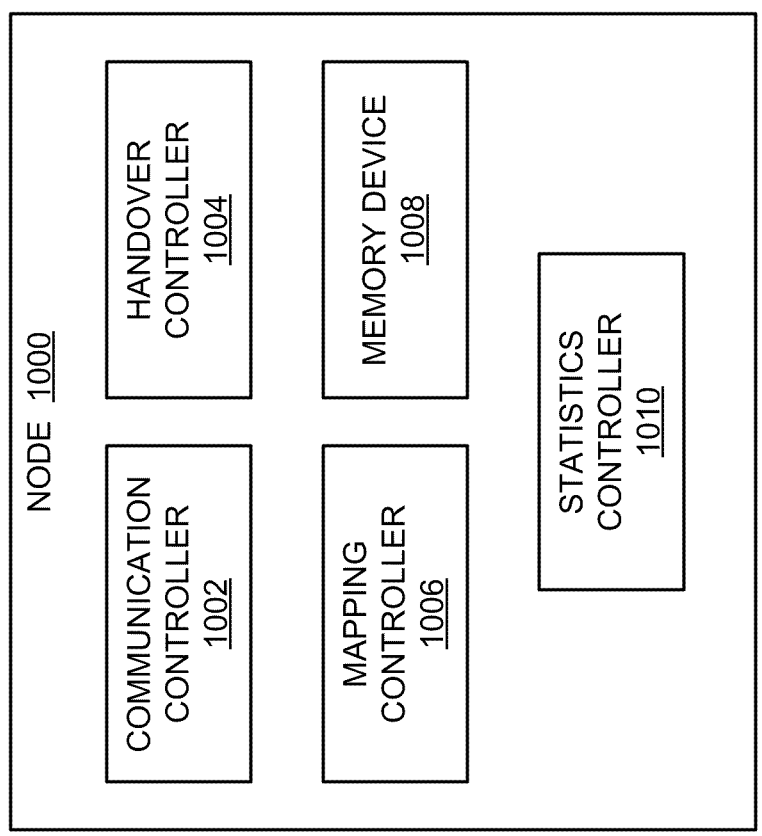
FIG. 10 is a simplified block diagram of several sample aspects of components that may be employed in a communication node.

FIG. 10 illustrates several sample components that may be incorporated into one or more nodes (represented, for convenience, by node 1000) such as an access point, a network node, or some other type of node to perform confusion resolution operations as taught herein. For example, the node 1000 may include a communication controller 1002 for managing communication (e.g., sending and receiving messages, reports, identifiers, and other information) with other nodes, and for providing other related functionality as taught herein. In addition, the node 1000 may include a handover controller 1004 for performing handover-related operations (e.g., determining whether and how to perform a handover, determining whether there is confusion and resolving the confusion, identifying access points for handover, sending and receiving messages), and for providing other related functionality as taught herein. The node 1000 also may include a mapping controller 1006 and associated memory device 1008 for determining a mapping for an access terminal and storing information indicative of the mapping, and for providing other related functionality as taught herein. Also, in some implementations the node 1000 may include a statistics controller 1010 for providing statistical information (e.g., acquiring and calculating) and storing the statistical information, and for providing other related functionality as taught herein.

For convenience the node 1000 is shown in FIG. 10 as including components that may be used in the various examples described above in conjunction with FIGS. 7-9. In practice, one or more of the illustrated components may not be used in a given example. As an example, in some implementations the node 1000 may not comprise the statistics controller 1010.

As discussed above, the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

As in the above discussion, an access point that provides coverage over a relatively large area may be referred to as a macro access point while an access point that provides coverage over a relatively small area (e.g., a residence) may be referred to as a femto access point. It should be appreciated that the teachings herein may be applicable to access points associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access node, base station, access point, eNodeB, macro cell, and so on. Also, a femto access point may be configured or referred to as a Home NodeB, Home eNodeB, access point base station, femto cell, and so on. In some implementations, an access point may be associated with (e.g., divided into) one or more cells or sectors. A cell or sector associated with a macro access point, a femto access point, or a pico access point may be referred to as a macro cell, a femto cell, or a pico cell, respectively.

Figure 11:
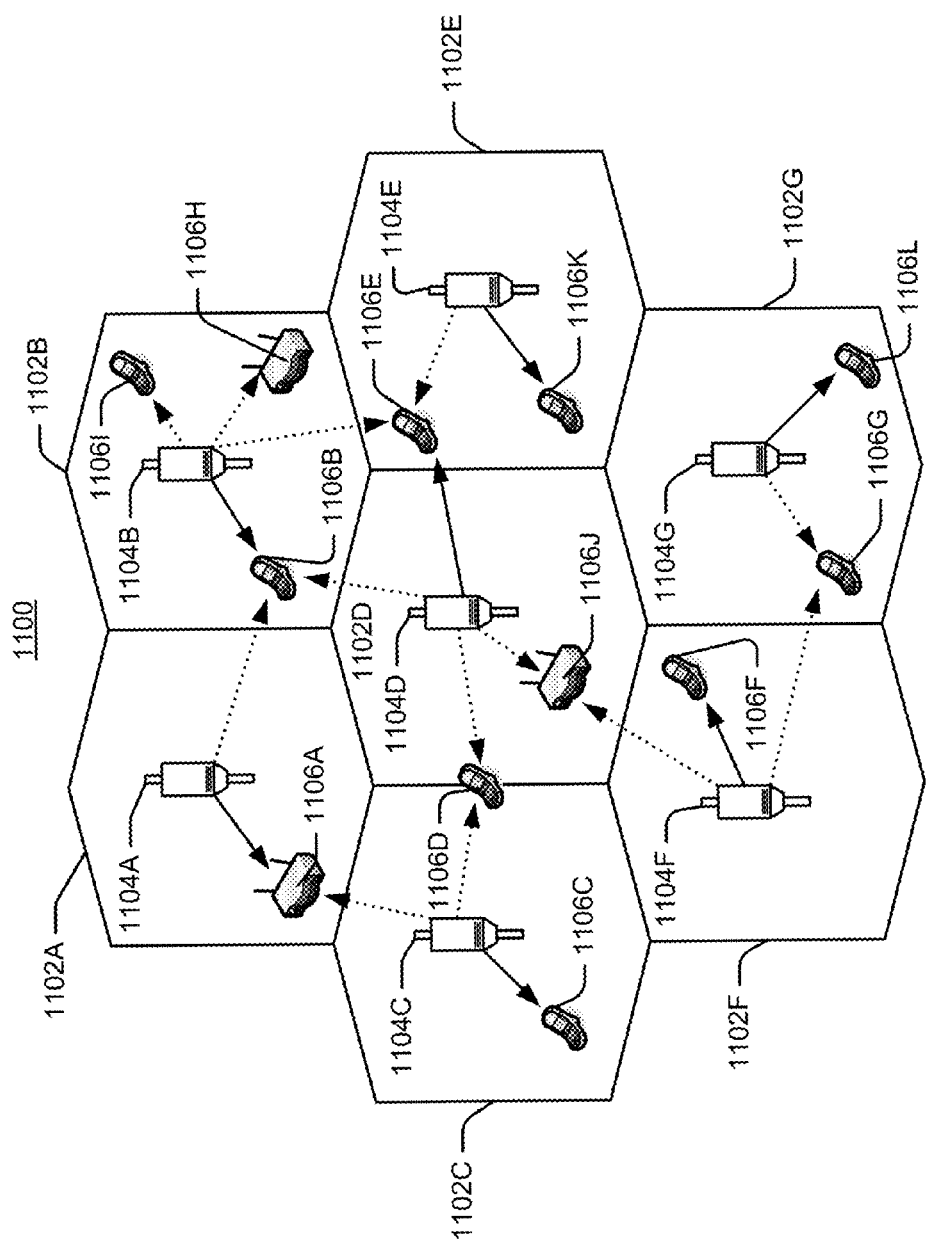
FIG. 11 is a simplified diagram of a wireless communication system.

FIG. 11 illustrates an example of a wireless communication system 1100, configured to support a number of users, in which the teachings herein may be implemented. The system 1100 provides communication for multiple cells 1102, such as, for example, macro cells 1102A-1102G, with each cell being serviced by a corresponding access point 1104 (e.g., access points 1104A-1104G). As shown in FIG. 11, access terminals 1106 (e.g., access terminals 1106A-1106L) may be dispersed at various locations throughout the system over time. Each access terminal 1106 may communicate with one or more access points 1104 on a forward link (FL) and/or a reverse link (RL) at a given moment, depending upon whether the access terminal 1106 is active and whether it is in soft handoff, for example. The wireless communication system 1100 may provide service over a large geographic region. For example, macro cells 1102A-1102G may cover a few blocks in a neighborhood or several miles in rural environment.

Figure 12:
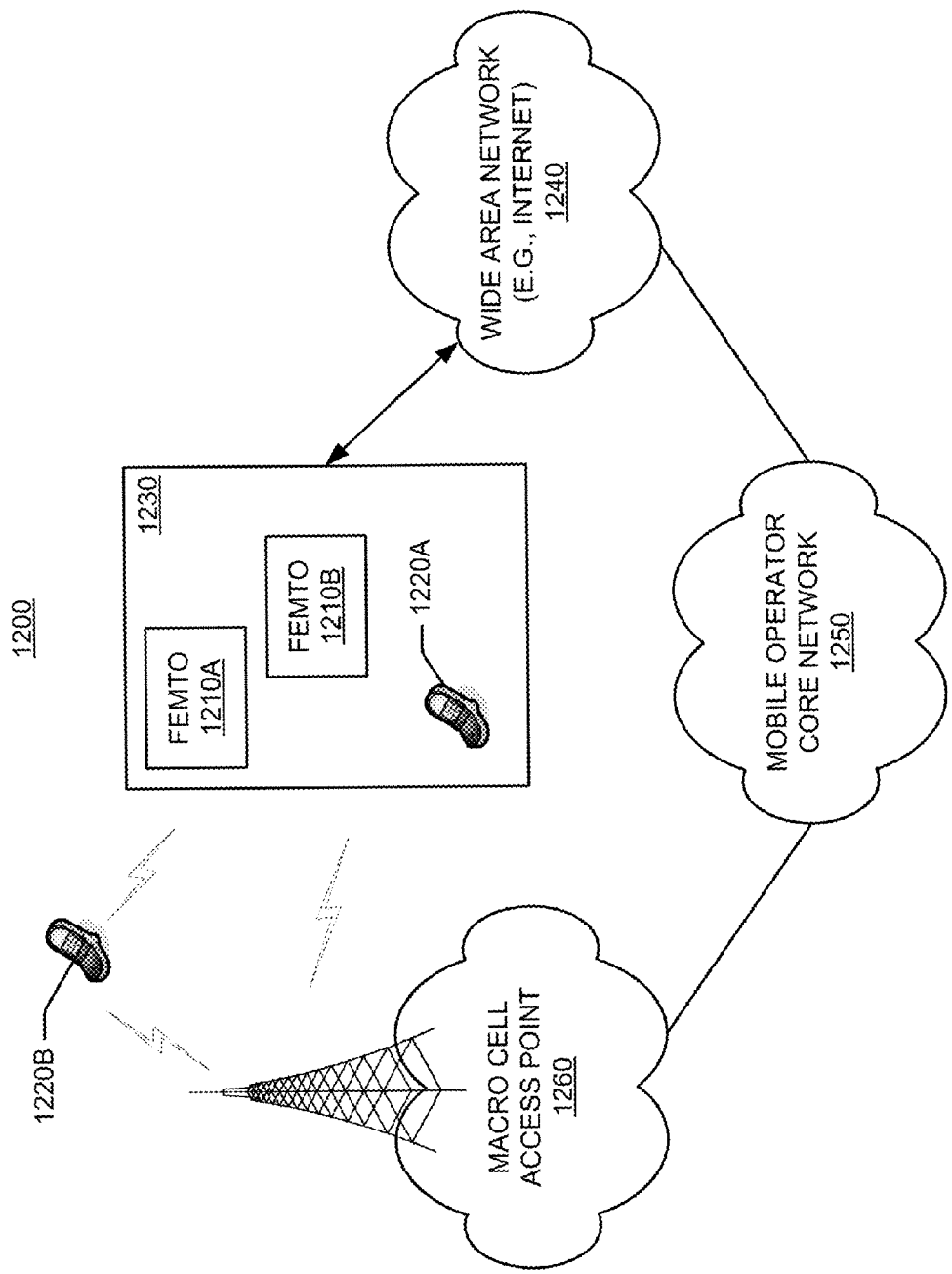
FIG. 12 is a simplified diagram of a wireless communication system including femto nodes.

FIG. 12 illustrates an exemplary communication system 1200 where one or more femto access points are deployed within a network environment. Specifically, the system 1200 includes multiple femto access points 1210 (e.g., femto access points 1210A and 1210B) installed in a relatively small scale network environment (e.g., in one or more user residences 1230). Each femto access point 1210 may be coupled to a wide area network 1240 (e.g., the Internet) and a mobile operator core network 1250 via a DSL router, a cable modem, a wireless link, or other connectivity means (not shown). As will be discussed below, each femto access point 1210 may be configured to serve associated access terminals 1220 (e.g., access terminal 1220A) and, optionally, other (e.g., hybrid or alien) access terminals 1220 (e.g., access terminal 1220B). In other words, access to femto access points 1210 may be restricted whereby a given access terminal 1220 may be served by a set of designated (e.g., home) femto access point(s) 1210 but may not be served by any non-designated femto access points 1210 (e.g., a neighbor's femto access point 1210).

Figure 13:
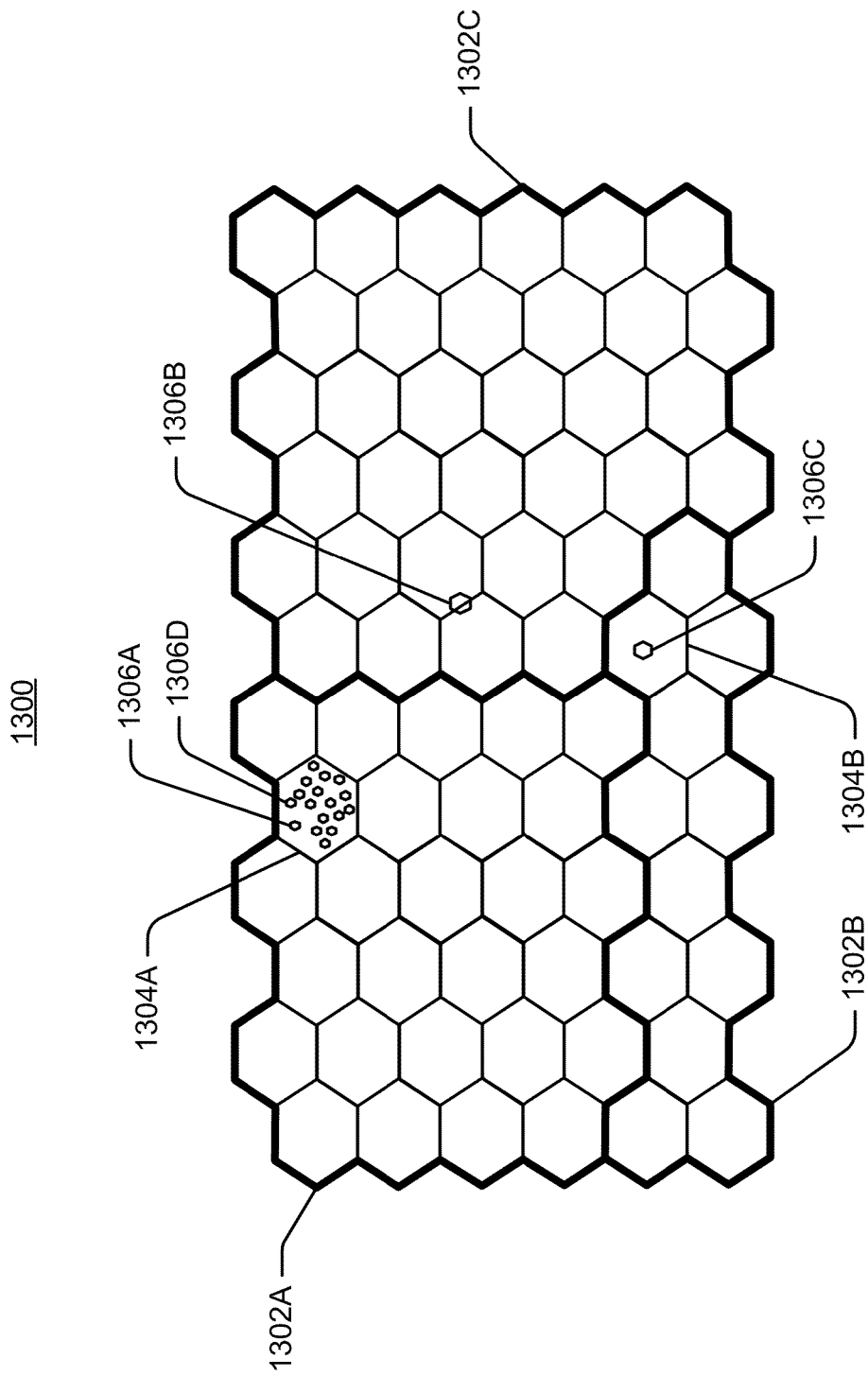
FIG. 13 is a simplified diagram illustrating coverage areas for wireless communication.

FIG. 13 illustrates an example of a coverage map 1300 where several tracking areas 1302 (or routing areas or location areas) are defined, each of which includes several macro coverage areas 1304. Here, areas of coverage associated with tracking areas 1302A, 1302B, and 1302C are delineated by the wide lines and the macro coverage areas 1304 are represented by the larger hexagons. The tracking areas 1302 also include femto coverage areas 1306. In this example, each of the femto coverage areas 1306 (e.g., femto coverage areas 1306B and 1306C) is depicted within one or more macro coverage areas 1304 (e.g., macro coverage areas 1304A and 1304B). It should be appreciated, however, that some or all of a femto coverage area 1306 may not lie within a macro coverage area 1304. In practice, a large number of femto coverage areas 1306 (e.g., femto coverage areas 1306A and 1306D) may be defined within a given tracking area 1302 or macro coverage area 1304. Also, one or more pico coverage areas (not shown) may be defined within a given tracking area 1302 or macro coverage area 1304.

Referring again to FIG. 12, the owner of a femto access point 1210 may subscribe to mobile service, such as, for example, 3G mobile service, offered through the mobile operator core network 1250. In addition, an access terminal 1220 may be capable of operating both in macro environments and in smaller scale (e.g., residential) network environments. In other words, depending on the current location of the access terminal 1220, the access terminal 1220 may be served by a macro cell access point 1260 associated with the mobile operator core network 1250 or by any one of a set of femto access points 1210 (e.g., the femto access points 1210A and 1210B that reside within a corresponding user residence 1230). For example, when a subscriber is outside his home, he is served by a standard macro access point (e.g., access point 1260) and when the subscriber is at home, he is served by a femto access point (e.g., access point 1210A). Here, a femto access point 1210 may be backward compatible with legacy access terminals 1220.

A femto access point 1210 may be deployed on a single frequency or, in the alternative, on multiple frequencies. Depending on the particular configuration, the single frequency or one or more of the multiple frequencies may overlap with one or more frequencies used by a macro access point (e.g., access point 1260).

In some aspects, an access terminal 1220 may be configured to connect to a preferred femto access point (e.g., the home femto access point of the access terminal 1220) whenever such connectivity is possible. For example, whenever the access terminal 1220A is within the user's residence 1230, it may be desired that the access terminal 1220A communicate only with the home femto access point 1210A or 1210B.

In some aspects, if the access terminal 1220 operates within the macro cellular network 1250 but is not residing on its most preferred network (e.g., as defined in a preferred roaming list), the access terminal 1220 may continue to search for the most preferred network (e.g., the preferred femto access point 1210) using a Better System Reselection (BSR), which may involve a periodic scanning of available systems to determine whether better systems are currently available, and subsequent efforts to associate with such preferred systems. With the acquisition entry, the access terminal 1220 may limit the search for specific band and channel. For example, one or more femto channels may be defined whereby all femto access points (or all restricted femto access points) in a region operate on the femto channel(s). The search for the most preferred system may be repeated periodically. Upon discovery of a preferred femto access point 1210, the access terminal 1220 selects the femto access point 1210 for camping within its coverage area.

A femto access point may be restricted in some aspects. For example, a given femto access point may only provide certain services to certain access terminals. In deployments with so-called restricted (or closed) association, a given access terminal may only be served by the macro cell mobile network and a defined set of femto access points (e.g., the femto access points 1210 that reside within the corresponding user residence 1230). In some implementations, an access point may be restricted to not provide, for at least one node, at least one of: signaling, data access, registration, paging, or service.

In some aspects, a restricted femto access point (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto access points) that share a common access control list of access terminals.

Various relationships may thus exist between a given femto access point and a given access terminal. For example, from the perspective of an access terminal, an open femto access point may refer to a femto access point with no restricted association (e.g., the femto access point allows access to any access terminal). A restricted femto access point may refer to a femto access point that is restricted in some manner (e.g., restricted for association and/or registration). A home femto access point may refer to a femto access point on which the access terminal is authorized to access and operate on (e.g., permanent access is provided for a defined set of one or more access terminals). A guest femto access point may refer to a femto access point on which an access terminal is temporarily authorized to access or operate on. An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point (e.g., the access terminal has permanent access to the femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the credentials or permission to register with the restricted femto access point).

For convenience, the disclosure herein describes various functionality in the context of a femto access point. It should be appreciated, however, that a pico access point or some other type of node may provide the same or similar functionality for a different (e.g., larger) coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 14:
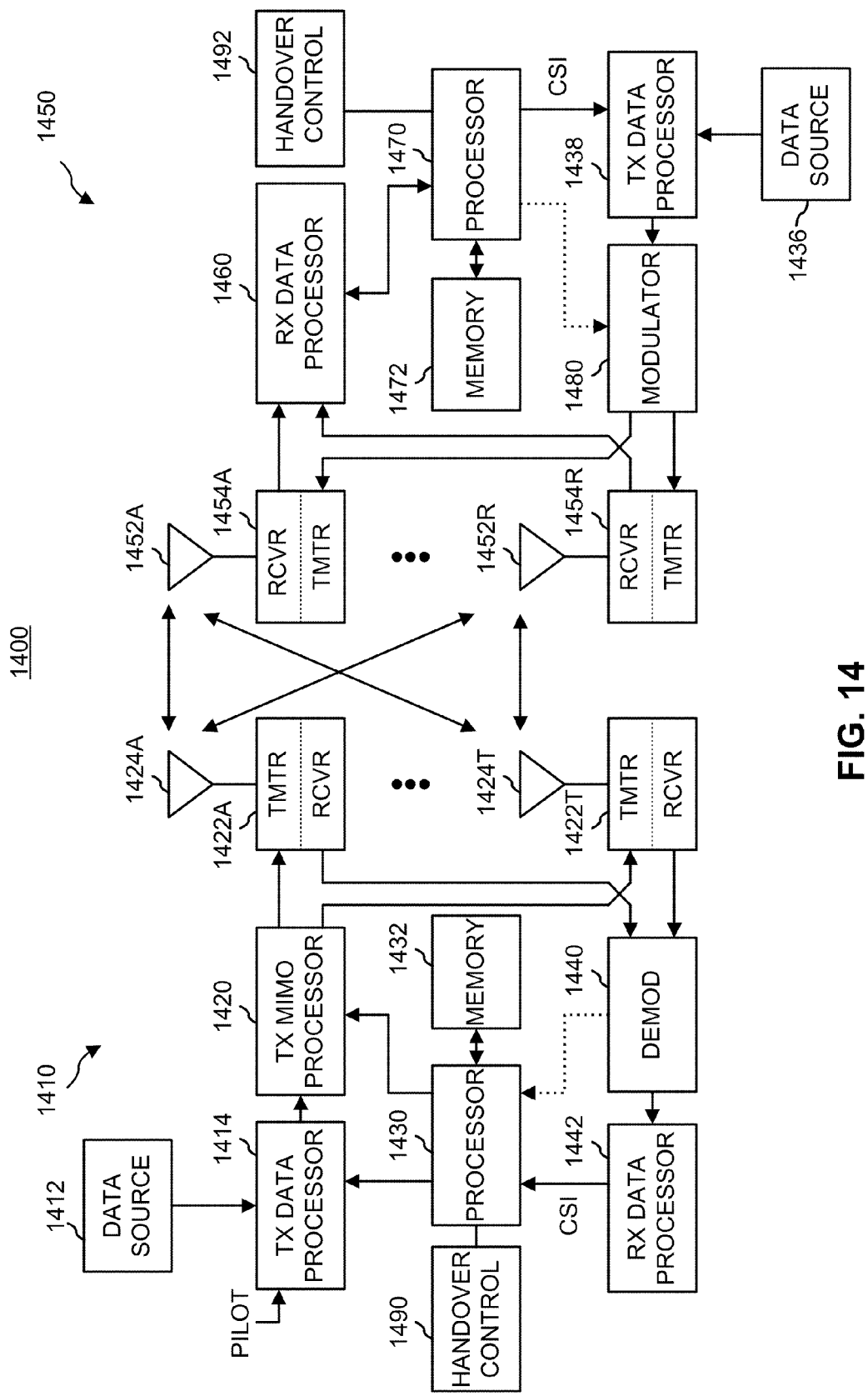
FIG. 14 is a simplified block diagram of several sample aspects of communication components.
Figure 15:
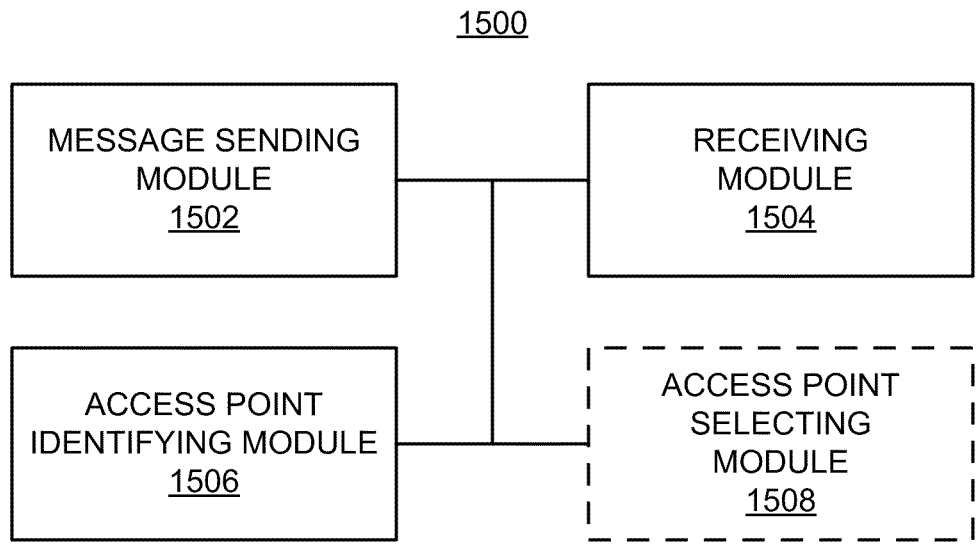
FIGS. 15-19 are simplified block diagrams of several sample aspects of apparatuses configured to provide ambiguity resolution as taught herein.
Figure 16:
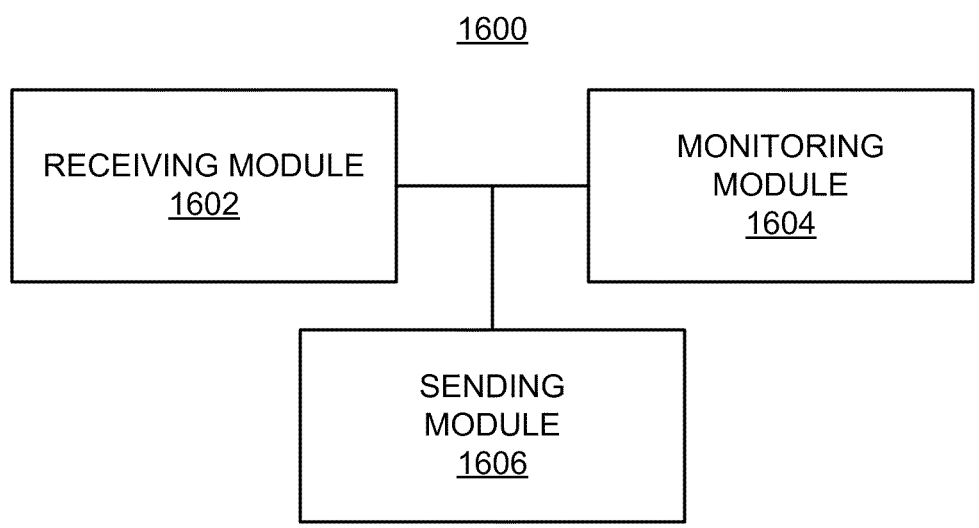
Figure 17:
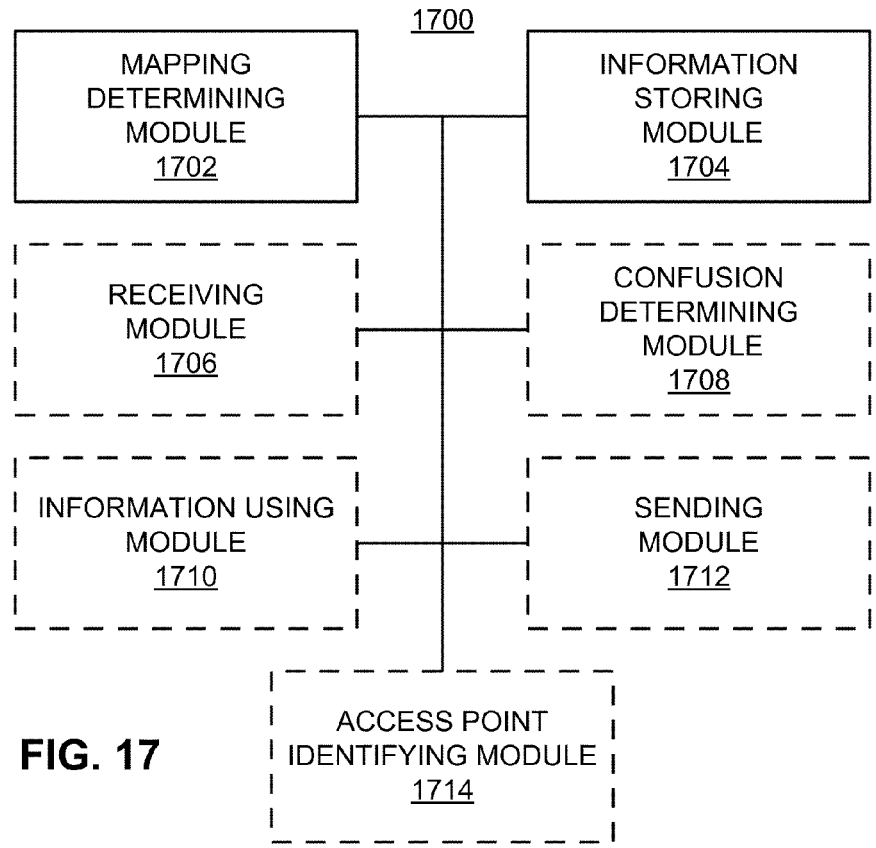
Figure 18:
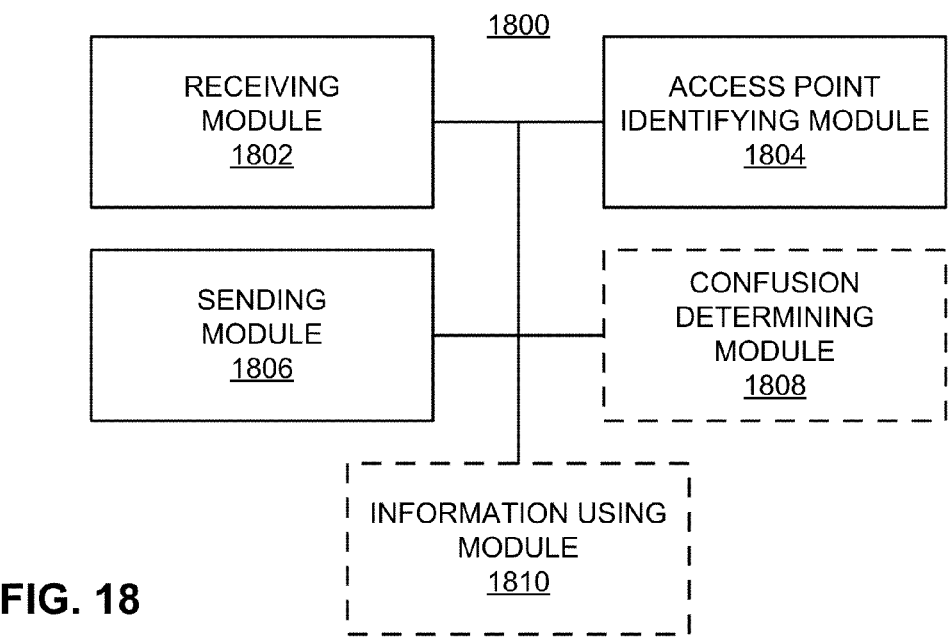
Figure 19:
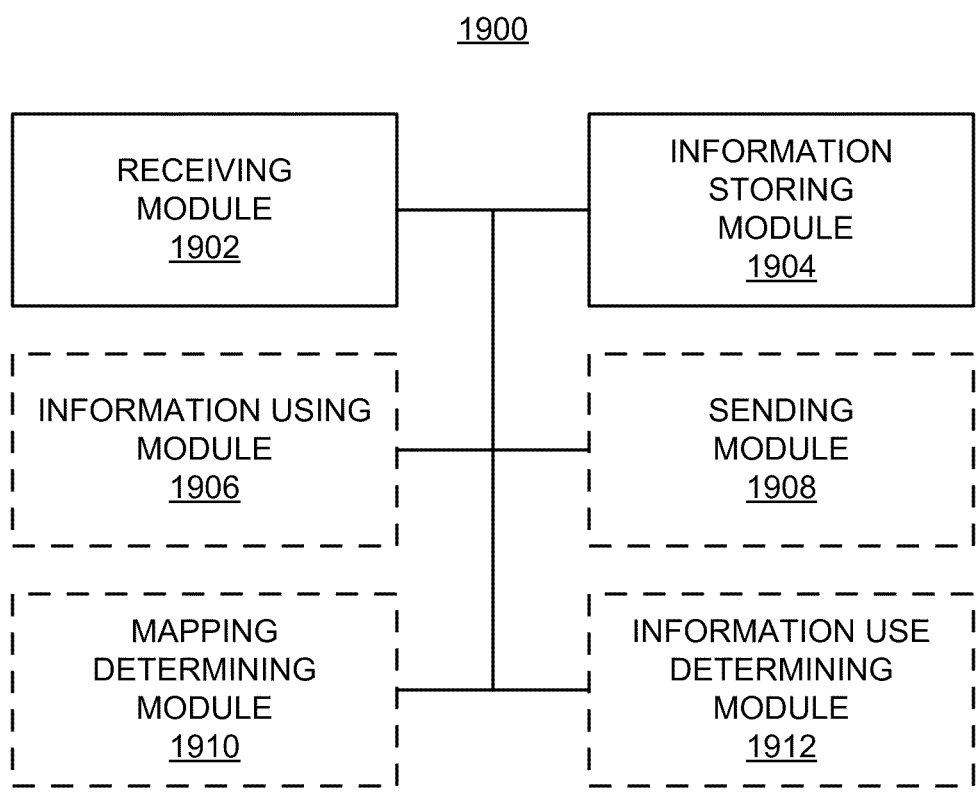

FIG. 14 illustrates a wireless device 1410 (e.g., an access point) and a wireless device 1450 (e.g., an access terminal) of a sample MIMO system 1400. At the device 1410, traffic data for a number of data streams is provided from a data source 1412 to a transmit ("TX") data processor 1414. Each data stream may then be transmitted over a respective transmit antenna.

The TX data processor 1414 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1430. A data memory 1432 may store program code, data, and other information used by the processor 1430 or other components of the device 1410.

The modulation symbols for all data streams are then provided to a TX MIMO processor 1420, which may further process the modulation symbols (e.g., for OFDM). The TX MIMO processor 1420 then provides $N_T$ modulation symbol streams to $N_T$ transceivers ("XCVR") 1422A through 1422T. In some aspects, the TX MIMO processor 1420 applies beamforming weights to the symbols of the data streams and to the antenna from which the symbol is being transmitted.

Each transceiver 1422 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1422A through 1422T are then transmitted from $N_T$ antennas 1424A through 1424T, respectively.

At the device 1450, the transmitted modulated signals are received by $N_R$ antennas 1452A through 1452R and the received signal from each antenna 1452 is provided to a respective transceiver ("XCVR") 1454A through 1454R. Each transceiver 1454 conditions (e.g., filters, amplifies, and downconverts) a respective received signal, digitizes the conditioned signal to provide samples, and further processes the samples to provide a corresponding "received" symbol stream.

A receive ("RX") data processor 1460 then receives and processes the $N_R$ received symbol streams from $N_R$ transceivers 1454 based on a particular receiver processing technique to provide $N_T$ "detected" symbol streams. The RX data processor 1460 then demodulates, deinterleaves, and decodes each detected symbol stream to recover the traffic data for the data stream. The processing by the RX data processor 1460 is complementary to that performed by the TX MIMO processor 1420 and the TX data processor 1414 at the device 1410.

A processor 1470 periodically determines which pre-coding matrix to use (discussed below). The processor 1470 formulates a reverse link message comprising a matrix index portion and a rank value portion. A data memory 1472 may store program code, data, and other information used by the processor 1470 or other components of the device 1450.

The reverse link message may comprise various types of information regarding the communication link and/or the received data stream. The reverse link message is then processed by a TX data processor 1438, which also receives traffic data for a number of data streams from a data source 1436, modulated by a modulator 1480, conditioned by the transceivers 1454A through 1454R, and transmitted back to the device 1410.

At the device 1410, the modulated signals from the device 1450 are received by the antennas 1424, conditioned by the transceivers 1422, demodulated by a demodulator ("DE-MOD") 1440, and processed by a RX data processor 1442 to extract the reverse link message transmitted by the device 1450. The processor 1430 then determines which pre-coding matrix to use for determining the beam-forming weights then processes the extracted message.

FIG. 14 also illustrates that the communication components may include one or more components that perform handover control operations as taught herein. For example, a handover control component 1490 may cooperate with the processor 1430 and/or other components of the device 1410 to send/receive signals to/from another device (e.g., device 1450) as taught herein. Similarly, a handover control component 1492 may cooperate with the processor 1470 and/or other components of the device 1450 to send/receive signals to/from another device (e.g., device 1410). It should be appreciated that for each device 1410 and 1450 the functionality of two or more of the described components may be provided by a single component. For example, a single processing component may provide the functionality of the handover control component 1490 and the processor 1430 and a single processing component may provide the functionality of the handover control component 1492 and the processor 1470.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA"), cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11, IEEE 802.16, IEEE 802.20, Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Rel99, Rel5, Rel6, Rel7) technology, as well as 3GPP2 (1xRTT, 1xEV-DO RelO, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller ("RNC"), a base station ("BS"), a radio base station ("RBS"), a base station controller ("BSC"), a base transceiver station ("BTS"), a transceiver function ("TF"), a radio transceiver, a radio router, a basic service set ("BSS"), an extended service set ("ESS"), a macro cell, a macro node, a Home eNB ("HeNB"), a femto cell, a femto access point, a pico access point, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The functionality described herein (e.g., with regard to one or more of the accompanying figures) may correspond in some aspects to similarly designated "means for" functionality in the appended claims. Referring to FIGS. 15-19, apparatuses 1500, 1600, 1700, 1800, and 1900 are represented as a series of interrelated functional modules. Here, a message sending module 1502 may correspond at least in some aspects to, for example, a handover controller as discussed herein. A receiving module 1504 may correspond at least in some aspects to, for example, a communication controller as discussed herein. An access point identifying module 1506 may correspond at least in some aspects to, for example, a handover controller as discussed herein. An access point selecting module 1508 may correspond at least in some aspects to, for example, a handover controller as discussed herein. A receiving module 1602 may correspond at least in some aspects to, for example, a communication controller as discussed herein. A monitoring module 1604 may correspond at least in some aspects to, for example, a receiver as discussed herein. A sending module 1606 may correspond at least in some aspects to, for example, a communication controller as discussed herein. A mapping determining module 1702 may correspond at least in some aspects to, for example, a mapping controller as discussed herein. An information storing module 1704 may correspond at least in some aspects to, for example, a memory device as discussed herein. A receiving module 1706 may correspond at least in some aspects to, for example, a communication controller as discussed herein. A confusion determining module 1708 may correspond at least in some aspects to, for example, a handover controller as discussed herein. An information using module 1710 may correspond at least in some aspects to, for example, a handover controller as discussed herein. A sending module 1712 may correspond at least in some aspects to, for example, a handover controller as discussed herein. An access point identifying module 1714 may correspond at least in some aspects to, for example, a handover controller as discussed herein. A receiving module 1802 may correspond at least in some aspects to, for example, a communication controller as discussed herein. An access point identifying module 1804 may correspond at least in some aspects to, for example, a handover controller as discussed herein. A sending module 1806 may correspond at least in some aspects to, for example, a handover controller as discussed herein. A confusion determining module 1808 may correspond at least in some aspects to, for example, a handover controller as discussed herein. An information using module 1810 may correspond at least in some aspects to, for example, a handover controller as discussed herein. A receiving module 1902 may correspond at least in some aspects to, for example, a communication controller as discussed herein. An information storing module 1904 may correspond at least in some aspects to, for example, a statistics controller as discussed herein. An information using module 1906 may correspond at least in some aspects to, for example, a handover controller as discussed herein. A sending module 1908 may correspond at least in some aspects to, for example, a handover controller as discussed herein. A mapping determining module 1910 may correspond at least in some aspects to, for example, a handover controller as discussed herein. An information use determining module 1912 may correspond at least in some aspects to, for example, a handover controller as discussed herein.

The functionality of the modules of FIGS. 15-19 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 15-19 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of operating an apparatus, comprising:
sending messages to a plurality of access points that are assigned a common pilot identifier, wherein the messages request the plurality of access points to monitor for a signal from a specified access terminal in order to detect whether the signal is received at any of the plurality of access points;
receiving at least one response to the messages based on whether the signal is detected by at least one of the plurality of access points; and
identifying a target access point for a handover of the access terminal based on the at least one response,
wherein the identification of the target access point for the handover of the access terminal is based in part upon a similarity between (i) pilot phase information acquired by the access terminal and (ii) a neighbor list of the target access point or pilot phase information acquired by the target access point.

2. The method of claim 1, wherein:
the at least one response comprises at least one received signal measurement from at least one of the plurality of access points; and
the identification of the target access point for the handover of the access terminal is based on the at least one received signal measurement.

3. The method of claim 1, wherein:
the method further comprises receiving macro access point pilot phase information acquired by the access terminal; and
the identification of the target access point for the handover of the access terminal is based on a comparison of the macro access point pilot phase information acquired by the access terminal with other macro access point pilot phase information acquired by at least one of the plurality of access points.

4. The method of claim 1, wherein:
the method further comprises receiving a pilot measurement report of the access terminal;
the at least one response comprises at least one neighbor list of at least one of the plurality of access points; and
the identification of the target access point for the handover of the access terminal is based on a comparison of one or more pilots included in the pilot measurement report of the access terminal with the at least one neighbor list of at least one of the plurality of access points.

5. The method of claim 1, further comprising selecting the plurality of access points based on a record that indicates that the access terminal previously accessed the plurality of access points.

6. The method of claim 5, wherein the record indicates at least one of the group consisting of: a home femto access point for the access terminal, a time of access by the access terminal, and a quantity of accesses by the access terminal.

7. The method of claim 1, further comprising selecting the plurality of access points based on whether the access terminal is allowed to access the plurality of access points.

8. The method of claim 1, wherein the identification of the target access point for the handover of the access terminal is based on a tiered set of criteria for identifying candidate target access points for the handover of the access terminal whereby, if use of a higher tier criterion does not result in identification of the target access point for the handover of the access terminal, a lower tier criterion is used to identify the target access point for the handover of the access terminal.

9. The method of claim 1, further comprising:
receiving a message that indicates that the access terminal is to be handed-over to a femto access point assigned the common pilot identifier, wherein the received message includes the common pilot identifier; and
identifying a plurality of femto access points assigned the common pilot identifier that are designated as home femto access points for the access terminal, wherein the sending of the messages to the plurality of access points comprises sending the messages to the identified plurality of femto access points.

10. A method of operating an apparatus, comprising:
- receiving a message that indicates that an access terminal is to be handed-over to a femto access point assigned a common pilot identifier, wherein the received message includes the common pilot identifier;
- identifying a plurality of femto access points assigned the common pilot identifier that the access terminal has previously accessed;
- sending messages to the plurality of identified femto access points, wherein the messages request the plurality of identified femto access points to monitor for a signal from the access terminal in order to detect whether the signal is received at any of the plurality of identified femto access points;
- receiving at least one response to the messages based on whether the signal is detected by at least one of the plurality of identified femto access points; and
- identifying a target access point for a handover of the access terminal based on the at least one response.

11. The method of claim 1, wherein:
- an earliest received response of the at least one response comprises a negative response or a response that is associated with an invalid measurement result; and
- the earliest received response is ignored such that the identification of the target access point for the handover of the access terminal is not based on the earliest received response.

12. The method of claim 1, wherein the plurality of access points comprises femto access points.

13. The method of claim 1, wherein the common pilot identifier comprises a pilot pseudonoise offset or a physical cell identifier.

14. An apparatus for communication, comprising:
- a handover controller configured to send messages to a plurality of access points that are assigned a common pilot identifier, wherein the messages request the plurality of access points to monitor for a signal from a specified access terminal in order to detect whether the signal is received at any of the plurality of access points; and
- a communication controller configured to receive at least one response to the messages based on whether the signal is detected by at least one of the plurality of access points, wherein the handover controller is further configured to identify a target access point for a handover of the access terminal based on the at least one response,
- wherein the identification of the target access point for the handover of the access terminal is based in part upon a similarity between (i) pilot phase information acquired by the access terminal and (ii) a neighbor list of the target access point or pilot phase information acquired by the target access point.

15. The apparatus of claim 14, wherein:
- the at least one response comprises at least one received signal measurement from at least one of the plurality of access points; and
- the identification of the target access point for the handover of the access terminal is based on the at least one received signal measurement.

16. The apparatus of claim 14, wherein the handover controller is further configured to select the plurality of access points based on a record that indicates that the access terminal previously accessed the plurality of access points.

17. The apparatus of claim 16, wherein the record indicates at least one of the group consisting of: a home femto access point for the access terminal, a time of access by the access terminal, and a quantity of accesses by the access terminal.

18. The apparatus of claim 14, wherein the identification of the target access point for the handover of the access terminal is based on a tiered set of criteria for identifying candidate target access points for the handover of the access terminal whereby, if use of a higher tier criterion does not result in identification of the target access point for the handover of the access terminal, a lower tier criterion is used to identify the target access point for the handover of the access terminal.

19. An apparatus for communication, comprising:
- means for sending messages to a plurality of access points that are assigned a common pilot identifier, wherein the messages request the plurality of access points to monitor for a signal from a specified access terminal in order to detect whether the signal is received at any of the plurality of access points;
- means for receiving at least one response to the messages based on whether the signal is detected by at least one of the plurality of access points; and
- means for identifying a target access point for a handover of the access terminal based on the at least one response,
- wherein the identification of the target access point for the handover of the access terminal is based in part upon a similarity between (i) pilot phase information acquired by the access terminal and (ii) a neighbor list of the target access point or pilot phase information acquired by the target access point.

20. The apparatus of claim 19, wherein:
- the at least one response comprises at least one received signal measurement from at least one of the plurality of access points; and
- the identification of the target access point for the handover of the access terminal is based on the at least one received signal measurement.

21. The apparatus of claim 19, further comprising means for selecting the plurality of access points based on a record that indicates that the access terminal previously accessed the plurality of access points.

22. The apparatus of claim 21, wherein the record indicates at least one of the group consisting of: a home femto access point for the access terminal, a time of access by the access terminal, and a quantity of accesses by the access terminal.

23. The apparatus of claim 19, wherein the identification of the target access point for the handover of the access terminal is based on a tiered set of criteria for identifying candidate target access points for the handover of the access terminal whereby, if use of a higher tier criterion does not result in identification of the target access point for the handover of the access terminal, a lower tier criterion is used to identify the target access point for the handover of the access terminal.

24. A non-transitory computer-readable medium comprising code for causing a computer to:
- send messages to a plurality of access points that are assigned a common pilot identifier, wherein the messages request the plurality of access points to monitor for a signal from a specified access terminal in order to detect whether the signal is received at any of the plurality of access points;
- receive at least one response to the messages based on whether the signal is detected by at least one of the plurality of access points; and
- identify a target access point for a handover of the access terminal based on the at least one response,
- wherein the identification of the target access point for the handover of the access terminal is based in part upon a similarity between (i) pilot phase information acquired by the access terminal and (ii) a neighbor list of the target access point or pilot phase information acquired by the target access point.

25. The non-transitory computer-readable medium of claim 24, wherein:
the at least one response comprises at least one received signal measurement from at least one of the plurality of access points; and
the identification of the target access point for the handover of the access terminal is based on the at least one received signal measurement.

26. The non-transitory computer-readable medium of claim 24, wherein the computer-readable medium further comprises code for causing the computer to select the plurality of access points based on a record that indicates that the access terminal previously accessed the plurality of access points.

27. The non-transitory computer-readable medium of claim 26, wherein the record indicates at least one of the group consisting of: a home femto access point for the access terminal, a time of access by the access terminal, and a quantity of accesses by the access terminal.

28. The non-transitory computer-readable medium of claim 24, wherein the identification of the target access point for the handover of the access terminal is based on a tiered set of criteria for identifying candidate target access points for the handover of the access terminal whereby, if use of a higher tier criterion does not result in identification of the target access point for the handover of the access terminal, a lower tier criterion is used to identify the target access point for the handover of the access terminal.

29. A method of communication, comprising:
receiving a request at an access point to monitor for a signal from an access terminal, wherein the request comprises an identifier associated with the access terminal, wherein the request is received responsive to detection of the access terminal in proximity to a given access point that is identified by an access point identifier shared by the access point and at least one other access point;
monitoring for the signal by detecting whether the signal is received at the access point in response to the request in order to determine whether the given access point corresponds to the access point receiving the request; and
sending a response to the request based on whether the signal is detected as being received at the access point by the monitoring,
wherein the response is sent in association with a neighbor list of the access point or pilot phase information acquired by the access point to facilitate identification of a target access point for a handover of the access terminal.

30. The method of claim 29, wherein the response comprises a received signal measurement associated with receipt of the signal.

31. A method of communication, comprising:
receiving a request at an access point to monitor for a signal from an access terminal, wherein the request comprises an identifier associated with the access terminal;
monitoring for the signal by detecting whether the signal is received at the access point with a sufficient signal level in response to the request; and
sending a response to the request based on whether the signal is detected as being received at the access point with the sufficient signal level by the monitoring,
wherein the response comprises a received signal measurement associated with receipt of the signal, and
wherein the response further comprises at least one of the group consisting of: a list of neighbor macro access points and phase information associated with macro pilot signals acquired by the access point.

32. A method of communication, comprising:
receiving a request at an access point to monitor for a signal from an access terminal, wherein the request comprises an identifier associated with the access terminal;
monitoring for the signal by detecting whether the signal is received at the access point with a sufficient signal level in response to the request;
sending a response to the request based on whether the signal is detected as being received at the access point with the sufficient signal level by the monitoring, wherein the response comprises a received signal measurement associated with receipt of the signal, and
sending, prior to sending the response, at least one of the group consisting of: a list of neighbor macro access points and phase information associated with macro pilot signals acquired by the access point.

33. The method of claim 29, wherein:
the identifier comprises a long code mask used by the access terminal; and
the monitoring comprises monitoring for a signal transmitted using the long code mask.

34. The method of claim 29, further comprising receiving, as a result of sending the response, a message indicating that the access terminal is being handed-over to the access point.

35. The method of claim 29, wherein the access point comprises a femto access point.

36. An apparatus for communication, comprising:
a communication controller configured to receive a request at an access point to monitor for a signal from an access terminal, wherein the request comprises an identifier associated with the access terminal, wherein the request is received responsive to detection of the access terminal in proximity to a given access point that is identified by an access point identifier shared by the access point and at least one other access point; and
a receiver configured to monitor for the signal by detecting whether the signal is received at the access point in response to the request in order to determine whether the given access point corresponds to the access point receiving the request, wherein the communication controller is further configured to send a response to the request based on whether the signal is detected as being received at the access point by the monitoring,
wherein the response is sent in association with a neighbor list of the access point or pilot phase information acquired by the access point to facilitate identification of a target access point for a handover of the access terminal.

37. The apparatus of claim 36, wherein the response comprises a received signal measurement associated with receipt of the signal.

38. An apparatus for communication, comprising:
a communication controller configured to receive a request at an access point to monitor for a signal from an access terminal, wherein the request comprises an identifier associated with the access terminal; and
a receiver configured to monitor for the signal by detecting whether the signal is received at the access point with a sufficient signal level in response to the request, wherein the communication controller is further configured to send a response to the request based on whether the signal is detected as being received at the access point with the sufficient signal level by the monitoring, wherein the response comprises a received signal measurement associated with receipt of the signal, and
wherein the response further comprises at least one of the group consisting of: a list of neighbor macro access points and phase information associated with macro pilot signals acquired by the access point.

39. An apparatus for communication, comprising:
means for receiving a request at an access point to monitor for a signal from an access terminal, wherein the request comprises an identifier associated with the access terminal, wherein the request is received responsive to detection of the access terminal in proximity to a given access point that is identified by an access point identifier shared by the access point and at least one other access point;
means for monitoring for the signal by detecting whether the signal is received at the access in response to the request in order to determine whether the given access point corresponds to the access point receiving the request; and
means for sending a response to the request based on whether the signal is detected as being received at the access point by the monitoring,
wherein the response is sent in association with a neighbor list of the access point or pilot phase information acquired by the access point to facilitate identification of a target access point for a handover of the access terminal.

40. The apparatus of claim 39, wherein the response comprises a received signal measurement associated with receipt of the signal.

41. An apparatus for communication, comprising:
means for receiving a request at an access point to monitor for a signal from an access terminal, wherein the request comprises an identifier associated with the access terminal;
means for monitoring for the signal by detecting whether the signal is received at the access point with a sufficient signal level in response to the request; and
means for sending a response to the request based on whether the signal is detected as being received at the access point with the sufficient signal level by the monitoring, wherein the response comprises a received signal measurement associated with receipt of the signal, and
wherein the response further comprises at least one of the group consisting of: a list of neighbor macro access points and phase information associated with macro pilot signals acquired by the access point.

42. A non-transitory computer-readable medium comprising code for causing a computer to:
receive a request at an access point to monitor for a signal from an access terminal, wherein the request comprises an identifier associated with the access terminal, wherein the request is received responsive to detection of the access terminal in proximity to a given access point that is identified by an access point identifier shared by the access point and at least one other access point;
monitor for the signal by detecting whether the signal is received at the access point in response to the request in order to determine whether the given access point corresponds to the access point receiving the request; and
send a response to the request based on whether the signal is detected as being received at the access point, wherein the response is sent in association with a neighbor list of the access point or pilot phase information acquired by the access point to facilitate identification of a target access point for a handover of the access terminal.

43. The non-transitory computer-readable medium of claim 42, wherein the response comprises a received signal measurement associated with receipt of the signal.

44. A non-transitory computer-readable medium comprising code for causing a computer to:
receive a request at an access point to monitor for a signal from an access terminal, wherein the request comprises an identifier associated with the access terminal;
monitor for the signal by detecting whether the signal is received at the access point with a sufficient signal level in response to the request; and
send a response to the request based on whether the signal is detected as being received at the access point with the sufficient signal level by, wherein the response comprises a received signal measurement associated with receipt of the signal, and wherein the response further comprises at least one of the group consisting of: a list of neighbor macro access points and phase information associated with macro pilot signals acquired by the access point.

45. The method of claim 29, wherein the request is received from an access point controller that is configured to control a plurality of access points of a given type that includes the access point receiving the request.

46. The method of claim 45, wherein the given type of the plurality of access points is femto.

47. The method of claim 29, wherein the access point identifier is shared among different femto access points, and wherein the monitoring is performed to identify which of the different femto access points corresponds to the given access point at which the access terminal was detected.

48. The method of claim 1, further comprising:
receiving a report from the access terminal that indicates detection of a given access point among the plurality of access points that is assigned the common pilot identifier,
wherein the sending is performed responsive to the received report to determine which of the plurality of access points corresponds to the given access point, wherein the identifying identifies the given access point as the target access point for the handover of the access terminal.

49. A method of operating an apparatus, comprising:
determining that an access terminal detects one or more signals from a given access point that is allocated a common pilot identifier shared by a plurality of access points;
sending, in response to the determination, messages to the plurality of access points that are assigned the common pilot identifier to resolve uncertainty as to which of the plurality of access points corresponds to the given access point detected in proximity to the access terminal, wherein the messages request the plurality of access points to monitor for a signal from the access terminal in order to detect whether the signal is received at any of the plurality of access points;
receiving at least one response to the messages that includes a given response from one of the plurality of access points indicating detection of at least one signal from the access terminal;
resolving the uncertainty by identifying the access point providing the given response as the given access point that is in proximity to the access terminal; and designating the identified access point as a target access point for a handover of the access terminal based on the identification, wherein the designation of the target access point for the handover of the access terminal is based in part upon a similarity between (i) pilot phase information acquired by the access terminal and (ii) a neighbor list of the identified access point or pilot phase information acquired by the identified access point.

50. The method of claim 49, wherein the one or more signals detected by the access terminal from the given access point correspond to at least one pilot signal transmitted by the given access point.

51. A method of communication, comprising:

receiving a request at an access point to monitor for a signal from an access terminal, wherein the request comprises an identifier associated with the access terminal, wherein the request is received responsive to detection by the access terminal of a given access point that is identified by an access point identifier shared by the access point and at least one other access point;

monitoring for the signal by detecting whether the signal is received at the access point in response to the request; and sending a response to the request based on whether the signal is detected as being received at the access point by the monitoring to resolve uncertainty as to whether the access point receiving the request is the given access point in proximity to the access terminal by (i) identifying the access point as the given access point if the response indicates that the signal is detected by the monitoring, or (ii) indicating that the access point is not the given access point if the response indicates that the signal is not detected by the monitoring, wherein the response is sent in association with a neighbor list of the access point or pilot phase information acquired by the access point to facilitate identification of a target access point for a handover of the access terminal.

52. The method of claim 1, wherein the plurality of access points is selected based on a first comparison of macro access point pilot phase information acquired by the access terminal with macro access point pilot phase information acquired by the plurality of access points, or wherein the target access point is selected from at least one access point that provides the at least one response based on a second comparison of the macro access point pilot phase information acquired by the access terminal with macro access point pilot phase information acquired by the target access point, or wherein the plurality of access points is selected based on a third comparison of one or more pilots in a pilot measurement report of the access terminal with one or more neighbor lists of one or more of the plurality of access points, or wherein the target access point is selected based on a fourth comparison of the one or more pilots in the pilot measurement report of the access terminal with the neighbor list of the target access point.

* * * * *